(12) United States Patent
Lister et al.

(10) Patent No.: US 10,975,477 B2
(45) Date of Patent: Apr. 13, 2021

(54) METHODS AND SYSTEMS FOR THE ELECTROCHEMICAL REDUCTION OF CARBON DIOXIDE USING SWITCHABLE POLARITY MATERIALS

(71) Applicant: Battelle Energy Alliance, LLC, Idaho Falls, ID (US)

(72) Inventors: Tedd E. Lister, Bangor, ME (US); Eric J. Dufek, Ammon, ID (US); Aaron D. Wilson, Idaho Falls, ID (US); Luis A. Diaz Aldana, Idaho Falls, ID (US); Birendra Adhikari, Ammon, ID (US); Ningshengjie Gao, Idaho Falls, ID (US)

(73) Assignee: Battelle Energy Alliance, LLC, Idaho Falls, ID (US)

(*) Notice: Subject to any disclaimer, the term of this patent is extended or adjusted under 35 U.S.C. 154(b) by 0 days.

(21) Appl. No.: 16/651,738

(22) PCT Filed: Sep. 28, 2018

(86) PCT No.: PCT/US2018/053381
§ 371 (c)(1),
(2) Date: Mar. 27, 2020

(87) PCT Pub. No.: WO2019/070526
PCT Pub. Date: Apr. 11, 2019

(65) Prior Publication Data
US 2020/0255958 A1    Aug. 13, 2020

Related U.S. Application Data

(60) Provisional application No. 62/566,968, filed on Oct. 2, 2017.

(51) Int. Cl.
*C25B 1/04* (2006.01)
*B01D 53/62* (2006.01)
(Continued)

(52) U.S. Cl.
CPC .............. *C25B 1/04* (2013.01); *B01D 53/62* (2013.01); *B01D 53/78* (2013.01); *C25B 3/04* (2013.01);
(Continued)

(58) Field of Classification Search
CPC ...................................................... C25B 3/04
See application file for complete search history.

(56) References Cited

U.S. PATENT DOCUMENTS 8,778,545 B2    7/2014   Lehar et al.
8,850,826 B2   10/2014   Ennis
(Continued)

FOREIGN PATENT DOCUMENTS

AU    2014235193 B2    9/2014
EP       2529825 B1    3/2015
(Continued)

OTHER PUBLICATIONS

Jessop et al, CO2-triggered switchable solvents, surfactants, and other materials, Energy & Environmental Science, 2012, vol. 5, No. 6, Feb. 2012, pp. 7240-7253 (Year: 2012).*
(Continued)

*Primary Examiner* — Harry D Wilkins, III
(74) *Attorney, Agent, or Firm* — TraskBritt

(57) ABSTRACT

A method of electrochemically reducing $CO_2$ comprises introducing a first feed stream comprising $H_2O$ to a positive electrode of an electrolysis cell comprising the positive electrode, a negative electrode, and a proton conducting membrane. A second feed stream comprising a solvent and a non polar form of a switchable polarity material is directed into a $CO_2$ capture apparatus. A third feed stream comprising $CO_2$ is directed into the $CO_2$ capture apparatus to interact with the second feed stream and form a first product stream comprising the solvent and a polar form of the switchable
(Continued)

polarity material. The first product stream is introduced to the negative electrode. A potential difference is applied between the positive electrode and the negative electrode to convert the polar form of the switchable polarity material into $CO_2$ and the non-polar form and to form products from the $CO_2$ and the solvent. A $CO_2$ treatment system is also described.

21 Claims, 7 Drawing Sheets

(51) Int. Cl.

| | |
|---|---|
| B01D 53/78 | (2006.01) |
| C25B 9/08 | (2006.01) |
| C25B 11/04 | (2006.01) |
| C25B 13/08 | (2006.01) |
| C25B 15/08 | (2006.01) |
| C25B 3/04 | (2006.01) |

(52) U.S. Cl.
CPC .......... *C25B 9/08* (2013.01); *C25B 11/0405* (2013.01); *C25B 11/0415* (2013.01); *C25B 11/0473* (2013.01); *C25B 13/08* (2013.01); *C25B 15/08* (2013.01); *B01D 2252/20415* (2013.01); *B01D 2252/20431* (2013.01); *B01D 2252/20442* (2013.01); *B01D 2257/504* (2013.01)

(56) References Cited

U.S. PATENT DOCUMENTS

| | | | | |
|---|---|---|---|---|
| 2004/0219090 | A1* | 11/2004 | Dziedzic | C01D 7/00 423/437.1 |
| 2013/0056676 | A1 | 3/2013 | Heldebrant et al. | |
| 2013/0058857 | A1* | 3/2013 | Stern | C25B 11/04 423/415.1 |
| 2013/0105304 | A1* | 5/2013 | Kaczur | C25B 3/04 204/237 |
| 2013/0118910 | A1* | 5/2013 | Teamey | C25B 9/10 205/427 |
| 2013/0180865 | A1* | 7/2013 | Cole | C25B 15/00 205/441 |
| 2013/0327989 | A1* | 12/2013 | Jessop | B01D 17/048 252/364 |
| 2014/0151240 | A1* | 6/2014 | Bedell | B01D 53/1475 205/455 |
| 2014/0183038 | A1* | 7/2014 | Lakkaraju | B01D 53/1475 204/252 |
| 2014/0291162 | A1 | 10/2014 | Sala et al. | |
| 2015/0014182 | A1* | 1/2015 | Park | B01D 53/1493 205/450 |
| 2015/0099623 | A1 | 4/2015 | Nishihara et al. | |
| 2015/0252482 | A1* | 9/2015 | Ono | C25B 11/03 204/252 |
| 2015/0252483 | A1* | 9/2015 | Ono | C25B 9/06 204/252 |
| 2016/0016115 | A1* | 1/2016 | Wilson | C02F 1/445 210/648 |
| 2016/0076159 | A1* | 3/2016 | Huang | C25B 13/04 204/252 |
| 2016/0108530 | A1 | 4/2016 | Masel et al. | |

FOREIGN PATENT DOCUMENTS

| | | | |
|---|---|---|---|
| EP | 2250440 B1 | 4/2015 | |
| EP | 2665544 B1 | 11/2016 | |
| EP | 3536823 A1 * | 9/2019 | ............... C25B 3/04 |
| KR | 10-2010-0077052 | 9/2013 | |
| WO | 2015/046659 A1 | 4/2015 | |
| WO | 2017/087360 A1 | 5/2017 | |

OTHER PUBLICATIONS

Diaz et al, Electrochemical production of syngas from CO2 captured in swithcable polarity solvents, Green Chemistry, vol. 20, No. 3 , Dec. 2017, pp. 620-626 (Year: 2017).*
Park et al, Chemical absorption of carbon dioxide with triethanolamine in non-aqueous solutions, Korean Journal of Chemical Engineering, vol. 23, Jan. 2006, pp. 138-143 (Year: 2006).*
Scovazzo et al, Electrochemical Separation and Concentration of <1% Carbon Dioxide from Nitrogen, Journal of the Electrochemical Society, vol. 150, No. 5, Apr. 2003, pp. D91-D98 (Year: 2003).*
Zhang et al, CO2-Binding-Organic-Liquids-Enhanced CO2 Capture using Polarity-Swing-Assisted Regeneration, Energy Procedia, vol. 37, Aug. 2013, pp. 285-291 (Year: 2013).*
Park et al, Recent advances in anhydrous solvents for CO2 capture: ionic liquids, switchable solvents, and nanoparticle organic hybrid materials, Frontiers in Energy Research, vol. 3, Article 42, Oct. 2015, pp. 1-14 (Year: 2015).*
Diaz, LA et al. Electrochemical production of syngas from CO2 captured in switchable polarity solvents. Green Chemistry. Dec. 14, 2017. vol. 20. No. 3. pp. 620-626; entire document, in particular pp. 621-622.
International Search Report and Written Opinion received for PCT Patent Application No. PCT/US18/53381, dated Dec. 12, 2018, 7 pages.
Li, Yuguang C. et al., CO2 Electroreduction from Carbonate Electrolyte, ACS Energy Letters, 2019, No. 4, pp. 1427-1431.

* cited by examiner

METHODS AND SYSTEMS FOR THE ELECTROCHEMICAL REDUCTION OF CARBON DIOXIDE USING SWITCHABLE POLARITY MATERIALS

CROSS-REFERENCE TO RELATED APPLICATIONS

This application is a national phase entry under 35 U.S.C. § 371 of International Patent Application PCT/US2018/053381, filed Sep. 28, 2018, designating the United States of America and published as International Patent Publication WO 2019/070526 A1 on Apr. 11, 2019, which claims the benefit of the filing date of U.S. Provisional Patent Application Ser. No. 62/566,968, filed Oct. 2, 2017, for "METHODS AND SYSTEMS FOR THE ELECTROCHEMICAL REDUCTION OF CARBON DIOXIDE USING SWITCHABLE POLARITY MATERIALS."

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

The disclosure, in various embodiments, relates to methods and systems for the electrochemical reduction of carbon dioxide ($CO_2$) using switchable polarity materials.

BACKGROUND

Increased combustion of fossil fuels (e.g., coal, crude oil, natural gas, etc.) and increased gasification of biomass feedstocks (e.g., wood, paper, food waste, municipal solid waste, etc.) driven by increased global energy demands has resulted in augmented $CO_2$ emissions into the atmosphere, and $CO_2$ emissions are projected to increase in the future. Concern over the possible negative effects (e.g., global warming effects) of escalating atmospheric $CO_2$ concentrations have compelled new approaches toward reducing, sequestering, storing, and/or utilizing emitted $CO_2$.

$CO_2$ can be utilized to synthesize a variety of commodity chemicals. For example, $CO_2$ can be reacted with hydrogen ($H_2$) gas in the presence of at least one catalyst produce one or more of carbon monoxide (CO) (e.g., through conventional Bosch and/or Boudouard reaction mechanisms) and formic acid ($CH_2O_2$) (e.g., through conventional hydrogenation reaction mechanisms), which may, in turn, be used to produce desirable commodity chemicals (e.g., formaldehyde, methanol, other alcohols, formates, carboxylic acids, esters, methylated amines, formamides, aldehydes, other hydrocarbons, etc.) through conventional reaction mechanisms. Unfortunately, conventional processes (e.g., conventional adsorption processes, conventional membrane gas separation processes, etc.) of $CO_2$ capture and storage (CCS) for sequent utilization can be inefficient and costly. In addition, producing commodity chemicals from captured $CO_2$ can be energy intensive (e.g., generating more $CO_2$ than that consumed to produce the commodity chemicals) and/or prohibitively expensive (e.g., employing costly catalyst materials to effectuate desirable reaction kinetics).

It would be desirable to have new methods, systems, and apparatuses for the electrochemical reduction of $CO_2$. It would further be desirable if the new methods, systems, and apparatuses facilitated increased $CO_2$ capture and conversion efficiency, and were relatively inexpensive and simple in operation.

BRIEF SUMMARY

Embodiments described herein include methods and systems for the electrochemical reduction of $CO_2$. In accordance with one embodiment described herein, a method of electrochemically reducing $CO_2$ comprises introducing a first feed stream comprising $H_2O$ to a positive electrode of an electrolysis cell comprising the positive electrode, a negative electrode, and a proton-conducting membrane between the positive electrode and the negative electrode. A second feed stream comprising a solvent and a non-polar form of a switchable polarity material is directed into a $CO_2$ capture apparatus. A third feed stream comprising $CO_2$ is directed into the $CO_2$ capture apparatus to interact with the second feed stream and form a first product stream comprising the solvent and a polar form of the switchable polarity material. The first product stream is introduced to the negative electrode of the electrolysis cell. A potential difference is applied between the positive electrode and the negative electrode of the electrolysis cell to generate hydrogen ions from the $H_2O$ that diffuse through the proton-conducting membrane to convert the polar form of the switchable polarity material into $CO_2$ and the non-polar form of the switchable polarity material and to form one or more products from the produced $CO_2$ and the solvent.

In additional embodiments, a method of electrochemically reducing $CO_2$ comprises reacting gaseous $CO_2$ with a mixture of at least one tertiary amine and $H_2O$ to form an aqueous tertiary aminium bicarbonate solution. The aqueous tertiary aminium bicarbonate solution is introduced to a negative electrode of an electrolysis cell while introducing additional $H_2O$ to a positive electrode of the electrolysis cell, the electrolysis cell comprising the negative electrode, the positive electrode, and a proton-conductive membrane between the negative electrode and the positive electrode. The electrolysis cell is activated to convert a portion of the aqueous tertiary aminium bicarbonate solution into a synthesis gas comprising CO and $H_2$.

In further embodiments, a $CO_2$ treatment system comprises an $H_2O$ source, a $CO_2$ source, a source of a non-polar form of a switchable polarity material, a $CO_2$ capture apparatus downstream of the $CO_2$ source and the source of the non-polar form of the switchable polarity material, and an electrochemical apparatus downstream of the $CO_2$ capture apparatus and the $H_2O$ source. The $CO_2$ capture apparatus is configured to effectuate the formation of a polar form of the switchable polarity material from reactions between $CO_2$ and the non-polar form of the switchable polarity material. The electrochemical apparatus comprises a housing structure and an electrolysis cell. The housing structure is configured and positioned to receive an $H_2O$ stream from the $H_2O$ source into a first region of an internal chamber thereof, and to receive another stream comprising the polar form of the switchable polarity material from the $CO_2$ capture apparatus into a second region of the internal chamber thereof. The electrolysis cell is located within the internal chamber of the housing structure and comprises a positive electrode adjacent the first region of the internal chamber, a negative electrode adjacent the second region of the internal chamber, and a proton-conducting membrane between the positive electrode and the negative electrode.

DETAILED DESCRIPTION

Figure 1:
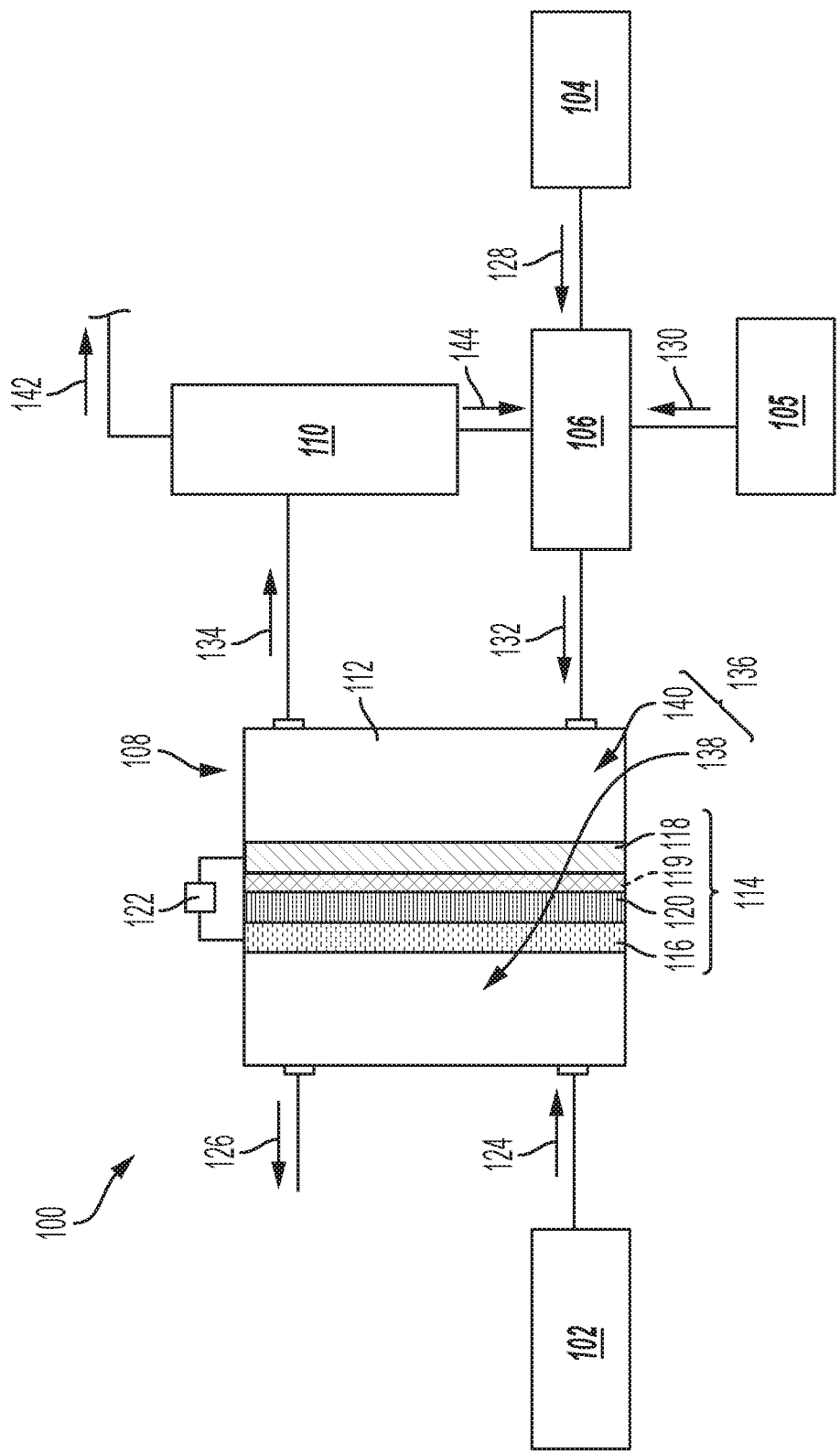
FIG. 1 is a simplified schematic view of a $CO_2$ treatment system, in accordance with an embodiment of the disclosure.

Methods and systems for electrochemically reducing $CO_2$ are disclosed. In some embodiments, a method of electrochemically reducing $CO_2$ includes reacting $CO_2$ with a mixture of a solvent (e.g., $H_2O$) and a non-polar form of at least one switchable polarity material (e.g., a tertiary amine compound, an amidine compound, a guanidine compound) to effectively capture the $CO_2$ as a bicarbonate ion ($HCO_3^-$) of a polar form of the at least one switchable polarity material (e.g., a tertiary aminium bicarbonate compound, an amidinium bicarbonate compound, a guanidinium bicarbonate compound). A switchable polarity material solution including the polar form of the switchable polarity material and the solvent is directed into an electrochemical apparatus including at least one electrolysis cell therein. The electrolysis cell comprises positive electrode (anode), a negative electrode (cathode), and a proton-conducting membrane between the positive electrode and the negative electrode. The switchable polarity material solution is provided to the negative electrode side of the electrolysis cell while $H_2O$ is provided to the positive electrode side of the electrolysis cell. Electrical current is applied to the $H_2O$ across the positive electrode and the negative electrode of the electrolysis cell to generate $O_2$ gas, hydrogen ions ($H^+$) (i.e., protons), and electrons ($e^-$). The generated $H^+$ permeate across the proton-conducting membrane of the electrolysis cell, and portion of generated $H^+$ react with polar form of the switchable polarity material at or near the negative electrode to produce $CO_2$ and the non-polar form of the switchable polarity material. The produced $CO_2$ and solvent (e.g., $H_2O$) at or near the negative electrode then undergo electrochemical reduction through reactions with received $e^-$ and an additional portion of the generated $H^+$ to form one or more desirable products (e.g., a synthesis gas (syngas) including carbon monoxide (CO) gas and hydrogen ($H_2$) gas). A multi-phase mixture including a gaseous phase including one or more gases (e.g., CO, $H_2$, $CO_2$), and at least one liquid phase including one or more liquids (e.g., the non-polar form of the switchable polarity material, remaining polar form of the switchable polarity material, remaining liquid solvent) may exit the electrochemical apparatus, and may be directed into a separation device to separate the gaseous phase from the liquid phase. The separated liquid phase may be introduced to additional $CO_2$ to form an additional amount of the non-polar form of the switchable polarity material, which may be used to repeat the process. The methods, systems, and apparatuses of the disclosure may be more efficient (e.g., increasing material conversion efficiency; reducing equipment, material, and/or energy requirements; etc.), and/or less complicated as compared to conventional methods, conventional systems, and conventional apparatuses for capturing $CO_2$ and synthesizing desirable materials therefrom.

The following description provides specific details, such as material compositions and processing conditions (e.g., temperatures, pressures, flow rates, etc.) in order to provide a thorough description of embodiments of the disclosure. However, a person of ordinary skill in the art will understand that the embodiments of the disclosure may be practiced without necessarily employing these specific details. Indeed, the embodiments of the disclosure may be practiced in conjunction with conventional systems and methods employed in the industry. In addition, only those process components and acts necessary to understand the embodiments of the present disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure. In addition, the drawings accompanying the disclosure are for illustrative purposes only, and are not meant to be actual views of any particular material, device, or system.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "configured" refers to a size, shape, material composition, material distribution, and arrangement of one or more of at least one structure and at least one apparatus facilitating operation of one or more of the structure and the apparatus in a pre-determined way.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, at least 99.9% met, or even 100.0% met.

As used herein, the term "about" in reference to a given parameter is inclusive of the stated value and has the meaning dictated by the context (e.g., it includes the degree of error associated with measurement of the given parameter).

As used herein, the term "negative electrode" means and includes an electrode having a relatively lower electrode potential in an electrochemical cell (i.e., lower than the electrode potential in a positive electrode therein). Conversely, as used herein, the term "positive electrode" means and includes an electrode having a relatively higher electrode potential in an electrochemical cell (i.e., higher than the electrode potential in a negative electrode therein).

As used herein the term "electrolyte" means and includes an ionic conductor, which can be in a solid state, a liquid state, or a gas state (e.g., plasma).

As used herein, the term "compatible" means that a material does not undesirably react, decompose, or absorb another material, and also that the material does not undesirably impair the chemical and/or mechanical properties of the another material.

An embodiment of the disclosure will now be described with reference to FIG. 1, which schematically illustrates a $CO_2$ treatment system 100. The $CO_2$ treatment system 100 may be used to convert $H_2O$ and $CO_2$ into $O_2$ and one or more desirable products. As shown in FIG. 1, the $CO_2$ treatment system 100 may include at least one $H_2O$ source 102, at least one $CO_2$ source 104, at least one switchable polarity material (SPM) source 105, at least one $CO_2$ capture apparatus 106 downstream of the $CO_2$ source 104 and the SPM source 105, at least one electrochemical apparatus 108 in fluid communication with (e.g., downstream of) each of the $H_2O$ source 102 and the $CO_2$ capture apparatus 106, and at least one separation apparatus 110 downstream of the electrochemical apparatus 108 and upstream of the $CO_2$ capture apparatus 106. The electrochemical apparatus 108 includes a housing structure 112, and at least one electrolysis cell 114 contained within the housing structure 112. The electrolysis cell 114 is electrically connected (e.g., coupled) to a power source 122, and includes a positive electrode 116 (e.g., anode), a negative electrode 118 (e.g., cathode), a proton-conducting membrane 120 between the positive electrode 116 and the negative electrode 118, and, optionally, a buffer structure 119 between the negative electrode 118 and the proton-conducting membrane 120.

With continued reference to FIG. 1, the $H_2O$ source 102 comprises at least one apparatus configured and operated to store and/or produce a one or more phases of an aqueous material (e.g., an aqueous liquid, such substantially pure liquid $H_2O$, or an aqueous liquid solution including liquid $H_2O$ and one or more other materials; an aqueous gas, such as substantially pure $H_2O$ steam, or an aqueous gas including $H_2O$ steam and one or more other materials). As a non-limiting example, the $H_2O$ source 102 may comprise a storage vessel (e.g., a tank) configured and operated to contain one or more of an aqueous liquid material and aqueous gas material. As another non-limiting example, the $H_2O$ source 102 may comprise a gas generation apparatus (e.g., a steam generation apparatus, such as a boiler apparatus) configured and operated produce an aqueous gas material (e.g., substantially pure $H_2O$ stream, an aqueous gas including gaseous $H_2O$ and one or more other materials). In some embodiments, the $H_2O$ source 102 comprises a liquid storage vessel configured and operated to contain an aqueous sulfuric acid ($H_2SO_4$) solution, such as an aqueous 1M $H_2SO_4$ solution. In additional embodiments, the $H_2O$ source 102 comprises a steam generation apparatus configured and operated to convert an aqueous liquid into an aqueous gaseous having a temperature within a range of an operating temperature of the electrolysis cell 114 of the electrochemical apparatus 108.

As shown in FIG. 1, at least one $H_2O$ stream 124 exits the $H_2O$ source 102, and may be directed into the electrochemical apparatus 108. The $H_2O$ stream 124 may only include $H_2O$, or may include $H_2O$ and one or more additional materials (e.g., one or more electrolyte materials, such one or more acids). In some embodiments, the $H_2O$ stream 124 is a substantially liquid stream comprising an aqueous 1M $H_2SO_4$ solution. The $H_2O$ stream 124 may exhibit any pressure and any flow rate facilitating the electrochemical reduction of one or more of $CO_2$, $CO_2$ electrochemical reduction products, and/or derivatives of $CO_2$ electrochemical reduction products (e.g., reaction products of $CO_2$ electrochemical reduction products and other molecules) within the electrochemical apparatus 108 to synthesize one or more desired products (e.g., one or more commodity chemicals), as described in further detail below. One or more apparatuses (e.g., pumps, compressors, expanders, mass flow control devices, etc.) may be employed within the $CO_2$ treatment system 100 to adjust the pressure(s) and/or flow rate(s) of the $H_2O$ stream 124 exiting the $H_2O$ source 102.

A single (e.g., only one) $H_2O$ stream 124 may exit the $H_2O$ source 102, or multiple (e.g., more than one) $H_2O$ streams 124 may exit the $H_2O$ source 102. If multiple $H_2O$ streams 124 exit the $H_2O$ source 102, each of the multiple $H_2O$ streams 124 may exhibit substantially the same properties (e.g., substantially the same material composition, substantially the same temperature, substantially the same pressure, substantially the same flow rate, etc.), or at least one of the multiple $H_2O$ streams 124 may exhibit one or more different properties (e.g., a different material composition, a different temperature; a different pressure; a different flow rate; etc.) than at least one other of the multiple $H_2O$ streams 124.

With continued reference to FIG. 1, the $CO_2$ source 104 comprises at least one apparatus configured and operated to store and/or produce a one or more phases of $CO_2$ (e.g., gaseous $CO_2$, liquid $CO_2$). As a non-limiting example, the $CO_2$ source 104 may comprise a storage vessel (e.g., a tank, a storage well) configured and operated to contain one or more of liquid $CO_2$ and gaseous $CO_2$. As another non-limiting example, the $CO_2$ source 104 may comprise at least one apparatus configured and operated to produce gaseous $CO_2$ through the treatment (e.g., combustion, gasification) of one or more organic materials. In some embodiments, the $CO_2$ source 104 is at least one combustion apparatus configured and operated to combust one or more hydrocarbon materials (e.g., coal, oil, natural gas, etc.) to generate energy and produce one or more effluent streams (e.g., gaseous effluent streams) including $CO_2$. In additional embodiments, the $CO_2$ source 104 is at least one gasification apparatus configured and operated to convert a biomass feedstock into a synthesis gas (e.g., a gas including hydrogen gas ($H_2$), $CO_2$, carbon monoxide, and one or more of nitrogen gas ($N_2$), $H_2O$, and lower hydrocarbons). The gasification apparatus may use at least one of logistical fuel and biomass/waste (e.g., wood, paper, food waste, municipal solid waste) as the biomass feedstock. In further embodiments, the $CO_2$ source 104 is the atmosphere of the planet Earth.

At least one $CO_2$ stream 128 including $CO_2$ (e.g., gaseous $CO_2$, liquid $CO_2$) exits the $CO_2$ source 104, and may be directed into the $CO_2$ capture apparatus 106. In some embodiments, the $CO_2$ stream 128 is formed of and includes gaseous $CO_2$. The $CO_2$ stream 128 may only include $CO_2$ (e.g., only gaseous $CO_2$), or may include $CO_2$ and one or more other materials (e.g., one or more of $N_2$; $H_2$; CO; lower hydrocarbon(s), such as methane, ethane, and/or propane; inert material(s), such as a noble gas; materials to be reacted with CO₂ electrochemical reduction products within the electrochemical apparatus 108 to form desired products; etc.). In some embodiments, the CO₂ stream 128 is substantially free of materials other than CO₂ gas. One or more apparatuses (e.g., heat exchangers, pumps, compressors, expanders, mass flow control devices, etc.) may be employed within the CO₂ treatment system 100 to adjust the one or more of the temperature, pressure, and flow rate of the CO₂ stream 128 delivered into the CO₂ capture apparatus 106.

A single (e.g., only one) CO₂ stream 128 may be directed into the CO₂ capture apparatus 106, or multiple (e.g., more than one) CO₂ streams 128 may be directed into the CO₂ capture apparatus 106. If multiple CO₂ streams 128 are directed into the CO₂ capture apparatus 106, each of the multiple CO₂ streams 128 may exhibit substantially the same properties (e.g., substantially the same material composition, substantially the same temperature, substantially the same pressure, substantially the same flow rate, etc.), or at least one of the multiple CO₂ streams 128 may exhibit one or more different properties (e.g., a different material composition, a different temperature, a different pressure, a different flow rate, etc.) than at least one other of the multiple CO₂ streams 128.

Still referring to FIG. 1, the SPM source 105 may comprise at least one apparatus configured and operated to store and/or produce a non-polar form of at least one SPM (also conventionally referred to as a "switchable polarity solvent" (SPS), a "switchable hydrophilicity material" (SHM), and a "switchable hydrophilicity solvent" (SHS)). As used herein, the term "switchable polarity material" means and includes a material that is configured to undergo a polarity shift when subjected to a change in reaction conditions (e.g., the addition or removal of CO₂ gas). For example, a SPM may switch (e.g., convert) from a non-polar form (e.g., a hydrophobic from) to a polar form (e.g., a hydrophilic form) when subjected to the change in reaction conditions, or may switch form a polar form to a non-polar form when subjected to the change in reaction conditions. The non-polar form and polar form of the SPM may each have a different solubility in a solvent, such as H₂O and/or an alcohol. By way of non-limiting example, the SPM source 105 may comprise one or more of a storage vessel (e.g., a tank) configured and operated to contain at least the non-polar form of the SPM, and an apparatus (e.g., a degassing apparatus) configured and operated at least to convert the polar form of the SPM into the non-polar form of the SPM. In some embodiments, the SPM source 105 comprises a storage tank.

The non-polar form of the SPM may comprise one or more of an amine compound (e.g., a tertiary amine compound), an amidine compound, and a guanidine compound. The general structure of each of an amine compound, an amidine compound, and a guanidine compound is, respectively, shown below:

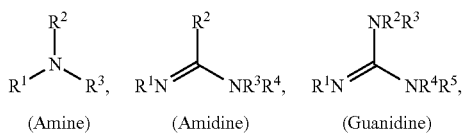

where $R^1$, $R^2$, $R^3$, $R^4$, and $R^5$ are independently hydrogen; a substituted or unsubstituted alkyl group (i.e., linear, branched, or cyclic) containing from 1 carbon atom to 10 carbon atoms; a substituted or unsubstituted $C_nSi_m$ group where n and m are independently an integer from 0 to 10 and n+m is an integer from 1 to 10; and a substituted or unsubstituted aryl group or heteroaryl group that may contain at least one $\{—Si(R^6)_2—O—\}$ where $R^6$ is a substituted or unsubstituted alkyl, aryl, heteroaryl, or alkoxy group. If a group is substituted, the substituent may be an alkyl, alkenyl, alkynl, alky halide, aryl, aryl halide, heteroaryl, non-aromatic ring, Si(alkyl)₃, Si(alkoxy)₃, alkoxy, amino, ester, amide, thioether, alkylcarbonate, or thioester group. Optionally, two or more of the $R^1$, $R^2$, $R^3$, $R^4$, and $R^5$ groups may form a ring structure (e.g., an alicyclic group, or an aryl group) with each other.

The non-polar form of the SPM may have a nitrogen atom to carbon atom ratio with a range of from about 1:2 to about 1:15. If the non-polar form of the SPM comprises at least one amine compound, the amine compound may comprise a tertiary amine compound fully saturated at the nitrogen position. $R^1$, $R^2$, and $R^3$ in a tertiary amine compound are each independently a moiety (e.g., a substituted or unsubstituted alkyl group; a substituted or unsubstituted aryl group) other than hydrogen. The amine compound may be linear, cyclic, or branched and may include a single nitrogen atom or multiple nitrogen atoms. The amine compound may be a monoamine compound (i.e., a compound including one amino group) or may a polyamine compound (i.e., a compound including two or more amino groups). In some embodiments, the amine compound has as one nitrogen atom and less than or equal to eleven (11) carbon atoms. Non-limiting examples of suitable amine compounds include 1-cyclohexylpiperidine, cyclohexyldimethylamine, 1-butylpyrrolidine, 1-ethylpiperidine, N,N-diethylcyclohexylamine, triethylamine, N,N-dibutylmethylamine, 2-ethylhexyl-N,N-dimethylamine, N-benzyldimethylamine, N,N-dimethyl-2-phenylethanamine, N,N-dimethyl-3-phenylpropanamine, N-methyldipropylamine, N-butyldiethylamine, N-butyldimethylamine, N,N-dimethylpentylamine, N-heptyldimethylamine, N,N-dimethyloctylamine, N,N-dimethylnonanamine, N-decyldimethylamine, and N-hexyldimethylamine. Non-limiting examples of suitable amidine compounds include N,N,N'-tripropylbutanamidine, N,N,N-tributylpentanamidine, and 1,8-diazabicyclo[5.4.0]undec-7-ene (DBU). Non-limiting examples of suitable guanidine compounds include 1,1,3,3-tetramethyl-2-phenylguanidine, 2-(2-fluorophenyl)-1,1,3,3-tetramethylguanidine, 1,1,3,3-tetraethyl-2-hexylguanidine, 2-butyl-1,1,3,3-tetraethylguanidine, and 2-hexyl-1,1,3,3-tetramethylguanidine. Suitable amine compounds, amidine compounds, and guanidine compounds are commercially available from numerous sources, such as from Sigma-Aldrich Company (St. Louis, Mo.). In some embodiments, the non-polar form of the SPM comprises 1-cyclohexylpiperidine, which has the following structure:

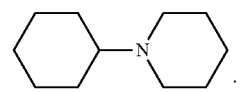 [SMILES: C1CCC(N2CCCCC2)CC1]

At least one SPM feed stream 130 including a non-polar form of at least one SPM (e.g., one or more of an amine compound, such as a tertiary amine compound; an amidine compound; and a guanidine compound) exits the SPM source 105, and may be directed into the CO₂ capture apparatus 106. The SPM feed stream 130 may be formed of and include the non-polar form of the SPM, at least one solvent, and, optionally, at least one additive. The solvent and the additive (if any) may be included with the non-polar form of the SPM in the SPM source 105, or may be subsequently combined (e.g., mixed) with the non-polar form of the SPM exiting the SPM source 105. In some embodiments, at least the non-polar form of the SPM and the solvent of the SPM feed stream 130 are obtained together from the SPM source 105.

The solvent of the SPM feed stream 130 may comprise at least one flowable material (e.g., fluid) that is compatible with the other components (e.g., the non-polar form of the SPM) of the SPM feed stream 130, and that facilitates the conversion of $CO_2$ of the $CO_2$ stream 128 and the non-polar form of the SPM of the SPM feed stream 130 into one or more desired products (e.g., aminium salts, such as tertiary aminium salts; amidinium salts; guanidinium salts) in the $CO_2$ capture apparatus 106, as described in further detail below. As used herein, the term "compatible" means that a material does not undesirably react, decompose, or absorb another material, and also that the material does not undesirably impair the chemical and/or mechanical properties of the another material. The solvent may comprise a liquid material, a gaseous material, or a combination thereof. In some embodiments, the solvent comprises a liquid material. The solvent may, for example, comprise an aqueous liquid material (e.g., substantially pure liquid $H_2O$, an aqueous liquid solution including liquid $H_2O$ and one or more other materials). In some embodiments, the solvent comprises substantially pure, liquid $H_2O$.

The additive (if any) of the SPM feed stream 130 may comprise one or more materials formulated to assist with the production of one or more desirable products from an SPM product stream 132 subsequently formed in the $CO_2$ capture apparatus 106 and directed into the electrochemical apparatus 108. By way of non-limiting example, if included in the SPM feed stream 130, the additive may comprise at least one electrolyte that increases the ionic conductivity of the SPM product stream 132. In some embodiments, the additive comprises potassium sulfate ($K_2SO_4$). In additional embodiments, SPM feed stream 130 is free of materials other than the at least one solvent and the non-polar form of at least one SPM.

A concentration of the non-polar form of the SPM in the SPM feed stream 130 may be tailored to a desired concentration of a polar form (e.g., hydrophilic form) of the SPM in a SPM product stream 132 to be formed in the $CO_2$ capture apparatus 106. The SPM feed stream 130 may, for example, include a sufficient concentration of the non-polar form of the SPM to form the SPM product stream 132 having a concentration of the polar form of the SPM within range of from a lowest effective concentration of the polar form of the SPM for downstream use of the SPM product stream 132 in the electrochemical apparatus 108 to a solubility limit of the polar form of the SPM in the SPM product stream 132. A concentration of the non-polar form of the SPM in the SPM feed stream 130 able to facilitate a sufficient concentration of the polar form of the SPM in the SPM product stream 132 for desired downstream use of the SPM product stream 132 in the electrochemical apparatus 108 may at least partially depend on the properties (e.g., material compositions, viscosities, pressures, temperatures, flow rates, etc.) of the SPM feed stream 130 and the $CO_2$ stream 128, and the properties (e.g., structural configurations, including individual component configurations; material compositions; etc.) of the $CO_2$ capture apparatus 106 and the electrochemical apparatus 108. As a non-limiting example, a concentration of the non-polar form of the SPM in the SPM feed stream 130 may be within a range of from about 0.1 mol/kg to about 20.0 mol/kg, such as from about 0.5 mol/kg to about 15.0 mol/kg, from about 1.0 mol/kg to about 10.0 mol/kg, or from about 1.0 mol/kg to about 5.0 mol/kg. The concentration of the non-polar form of the SPM entering the $CO_2$ capture apparatus 106 may be controlled as desired by adjusting one or more of an amount of the non-polar form of the SPM in the SPM feed stream 130, an amount of the solvent in the SPM feed stream 130, and an amount of the additive (if any) in the SPM feed stream 130.

The SPM feed stream 130 may be substantially homogeneous (e.g., each of the components of the SPM feed stream 130 may be uniformly dispersed throughout the SPM feed stream 130), or may be heterogeneous (e.g., at least one of the components of the SPM feed stream 130 may be non-uniformly dispersed throughout the SPM feed stream 130). In some embodiments, the SPM feed stream 130 is substantially homogeneous.

A single (e.g., only one) SPM feed stream 130 may be directed into the $CO_2$ capture apparatus 106, or multiple (e.g., more than one) SPM feed streams 130 may be directed into the $CO_2$ capture apparatus 106. If a single SPM feed stream 130 is directed into the $CO_2$ capture apparatus 106, the SPM feed stream 130 may comprise a mixture of materials (e.g., a mixture comprising the non-polar form of the SPM, the solvent, and the additive (if any)). If multiple SPM feed streams 130 are directed into the $CO_2$ capture apparatus 106, each of the SPM feed streams 130 may exhibit substantially the same properties (e.g., the same material composition, including the same type and amount of each of the non-polar form of the SPM and the solvent; the same temperature; the same pressure; the same flow rate; etc.), or at least one of the SPM feed streams 130 may exhibit one or more different properties (e.g., one or more of a different material composition, such a different type and/or a different amount of one or more of the non-polar form of the SPM and the solvent; a different temperature; a different pressure; a different flow rate; etc.) than at least one other of the SPM feed streams 130. Each of the multiple SPM feed streams 130 may individually comprise a single material (e.g., the non-polar form of the SPM, the solvent, the additive (if any)), each of the multiple SPM feed streams 130 may independently comprise a mixture of materials (e.g., a mixture of the non-polar form of the SPM, the solvent, and the additive (if any)), or at least one of the multiple SPM feed streams 130 may comprise a single material and at least one other of the multiple SPM feed streams 130 may comprise a mixture of materials. At least some of the multiple SPM feed streams 130 may be combined with one another prior to being directed into the $CO_2$ capture apparatus 106, and/or at least some of the multiple SPM feed streams 130 may be directed into the $CO_2$ capture apparatus 106 separately (e.g., discretely, individually, etc.) and combined with one another within $CO_2$ capture apparatus 106. If at least some of the multiple SPM feed streams 130 are separately directed into the $CO_2$ capture apparatus 106, the multiple SPM feed streams 130 may be directed into the $CO_2$ capture apparatus 106 simultaneously, non-simultaneously, or a combination thereof. In some embodiments, a single SPM feed stream 130 comprising a mixture of materials (e.g., the non-polar form of the SPM and the solvent) is directed into the $CO_2$ capture apparatus 106.

The SPM feed stream 130 and the $CO_2$ stream 128 may each individually exhibit a temperature, a pressure, and a flow rate facilitating the formation of a predetermined concentration of the polar form of the SPM in the SPM product stream 132 in a predetermined amount of time by way of interactions between components (e.g., the non-polar form of the SPM, the solvent, etc.) of the SPM feed stream 130 and the $CO_2$ of the $CO_2$ stream 128 within the $CO_2$ capture apparatus 106. The temperature(s), pressure(s), and flow rate(s) of the SPM feed stream 130 and the $CO_2$ stream 128 may facilitate the substantially complete conversion of $CO_2$ from the $CO_2$ stream 128, and may be selected relative to one another and at least partially based on the configuration of the $CO_2$ capture apparatus 106 (e.g., including the sizes, shapes, material compositions, and arrangements of the components thereof). In some embodiments, the temperature(s), pressure(s), and flow rate(s) of the SPM feed stream 130 and the $CO_2$ stream 128 are controlled (e.g., selected and/or adjusted) to facilitate the formation of an SPM product stream 132 including greater than or equal to about 2.0 mol/kg (e.g., greater than or equal to about 2.5 mol/kg, greater than or equal to about 3.0 mol/kg, greater than or equal to about 3.5 mol/kg, or greater than or equal to about 4.0 mol/kg) of the polar form of the SPM in less than or equal to about 4 hours (e.g., less than or equal to about 3 hours, less than or equal to about 2 hours, less than or equal to about 1 hour, etc.) residence time in the $CO_2$ capture apparatus 106.

The temperature(s) of the SPM feed stream 130 and the $CO_2$ stream 128 may be individually selected relative to one another, the material compositions of the SPM feed stream 130 and the $CO_2$ stream 128, and the configuration of the $CO_2$ capture apparatus 106 (e.g., including component sizes, component shapes, component material compositions, and component arrangements thereof) to control one or more of the viscosity of the SPM feed stream 130, chemical reaction rates during the formation of the polar form of the SPM within the $CO_2$ capture apparatus 106, the solubility of the $CO_2$ of the $CO_2$ stream 128 in the SPM feed stream 130, and the stability of the polar form of the SPM produced within $CO_2$ capture apparatus 106. The temperature(s) of the SPM feed stream 130 and the $CO_2$ stream 128 may, for example, be independently selected such that the production of the polar form of the SPM is limited by chemical reaction rate. By way of non-limiting example, temperature(s) of the SPM feed stream 130 and the $CO_2$ stream 128 may individually be within a range of from about 10° C. to about 40° C., such as from about 10° C. to about 30° C., or from about 20° C. to about 30° C. In some embodiments, each of the SPM feed stream 130 and the $CO_2$ stream 128 individually exhibit a temperature within a range of from about 20° C. to about 30° C. The SPM feed stream 130 and the $CO_2$ stream 128 may each individually exhibit a substantially constant (e.g., substantially invariable, substantially unchanging, etc.) temperature over the period of time the SPM feed stream 130 and the $CO_2$ stream 128 are directed into the $CO_2$ capture apparatus 106, or one or more of the SPM feed stream 130 and the $CO_2$ stream 128 may exhibit variable (e.g., non-constant, changing, etc.) temperatures over the period of time the SPM feed stream 130 and the $CO_2$ stream 128 are directed into the $CO_2$ capture apparatus 106.

The SPM feed stream 130 and the $CO_2$ stream 128 may each individually exhibit any pressure(s) permitting the $CO_2$ of the $CO_2$ stream 128 to interact with the components (e.g., the non-polar form to the SPM, the solvent) of SPM feed stream 130 to form the polar form of the SPM. The SPM feed stream 130 and the $CO_2$ stream 128 may each independently exhibit a substantially constant (e.g., substantially invariable, substantially unchanging, etc.) pressure over the period of time the SPM feed stream 130 and the $CO_2$ stream 128 are directed into the $CO_2$ capture apparatus 106, or one or more of the SPM feed stream 130 and the $CO_2$ stream 128 may exhibit variable (e.g., non-constant, changing, etc.) pressures over the period of time the SPM feed stream 130 and the $CO_2$ stream 128 are directed into the $CO_2$ capture apparatus 106. In some embodiments, the pressure of one or more of the SPM feed stream 130 and the $CO_2$ stream 128 is changed (e.g., increased) over the period of time the SPM feed stream 130 and the $CO_2$ stream 128 are directed into the $CO_2$ capture apparatus 106 to account for viscosity changes (e.g., increases in the viscosity of the SPM feed stream 130) within the $CO_2$ capture apparatus 106 during the production of the polar form of the SPM.

The flow rate(s) of the SPM feed stream 130 and the $CO_2$ stream 128 may be individually be selected relative to one another, the material compositions of the SPM feed stream 130 and the $CO_2$ stream 128, and the configuration of the $CO_2$ capture apparatus 106 to control residence time within the $CO_2$ capture apparatus 106 as well as the concentration of the polar form of the SPM produced within the $CO_2$ capture apparatus 106. By way of non-limiting example, the SPM feed stream 130 and the $CO_2$ stream 128 may each individually exhibit a flow rate greater than or equal to about 100 milliliters per minute (ml/min), such as a flow rate within a range of from about 100 ml/min to about 10000 ml/min, from about 200 ml/min to about 5000 ml/min, from about 300 ml/min to about 1000 ml/min, or from about 500 ml/min to about 1000 ml/min. The SPM feed stream 130 and the $CO_2$ stream 128 may each individually exhibit a substantially constant (e.g., substantially invariable, substantially unchanging, etc.) flow rate over the period of time the SPM feed stream 130 and the $CO_2$ stream 128 are directed into the $CO_2$ capture apparatus 106, or one or more of the SPM feed stream 130 and the $CO_2$ stream 128 may exhibit variable (e.g., non-constant, changing, etc.) flow rates over the period of time the SPM feed stream 130 and the $CO_2$ stream 128 are directed into the $CO_2$ capture apparatus 106. In some embodiments, the flow rate of at least the SPM feed stream 130 is substantially constant of the period of time the SPM feed stream 130 and the $CO_2$ stream 128 are directed into the $CO_2$ capture apparatus 106.

With continued reference to FIG. 1, the $CO_2$ capture apparatus 106 may comprise at least one device or apparatus configured and operated to form at least one SPM product stream 132 including the polar form of at least one SPM from components of the SPM feed stream 130 and the $CO_2$ stream 128. $CO_2$ of the $CO_2$ stream 128 may be introduced to and react with at least the non-polar form of the SPM and the solvent of the SPM feed stream 130 to form the SPM product stream 132, as described in further detail below. By way of non-limiting example, the $CO_2$ capture apparatus 106 may comprise one or more of a gas diffusion membrane apparatus, and a bubbler apparatus. In some embodiments, the $CO_2$ capture apparatus 106 is a gas diffusion membrane apparatus.

In embodiments wherein the SPM feed stream 130 directed into the $CO_2$ capture apparatus 106 includes at least one amine compound (e.g., at least one tertiary amine compound), $CO_2$ from the $CO_2$ stream 128 facilitates the formation of at least one aminium salt. As used herein, the term "aminium salt" means and includes an aminium cation and an anionic counterion and has a neutral charge. By way of non-limiting example, if the $CO_2$ stream 128 includes $CO_2$ and the SPM feed stream 130 includes at least one amine compound and $H_2O$, $CO_2$ of the $CO_2$ stream 128 reacts with the amine compound and the $H_2O$ of the SPM feed stream 130 to form an aminium bicarbonate (e.g., a tertiary aminium bicarbonate) according to the following reversible reaction:

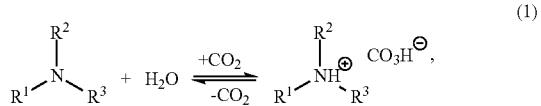

(1)

where $R^1$, $R^2$, and $R^3$ are as defined above; and where X is a substituted or unsubstituted alkyl, alkenyl, alkynyl, aryl, silyl, or siloxyl, and is linear, branched, or cyclic. Accordingly, the $CO_2$ from the $CO_2$ stream 128 becomes effectively captured as the bicarbonate ion ($HCO_3^-$) of the produced aminium bicarbonate.

In embodiments wherein the SPM feed stream 130 includes at least one amidine compound, $CO_2$ from the $CO_2$ stream 128 facilitates the formation of at least one amidinium salt. As used herein, the term "amidinium salt" means and includes an amidinium cation and an anionic counterion and has a neutral charge. As a non-limiting example, if the $CO_2$ stream 128 includes $CO_2$ and the SPM feed stream 130 includes at least one amidine compound and $H_2O$, $CO_2$ of the $CO_2$ stream 128 reacts with the amidine compound and the $H_2O$ of the SPM feed stream 130 to form an amidinium bicarbonate according to the following reversible reaction:

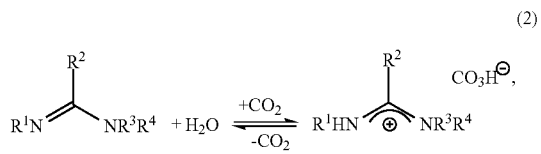

(2)

where $R^1$, $R^2$, $R^3$, $R^4$, and X are as defined above. Accordingly, the $CO_2$ from the $CO_2$ stream 128 becomes effectively captured as the $HCO_3^-$ of the produced amidinium bicarbonate.

In embodiments wherein the SPM feed stream 130 includes at least one guanidine compound, $CO_2$ from the $CO_2$ stream 128 facilitates the formation of at least one guanidinium salt. As used herein, the term "guanidinium salt" means and includes a guanidinium cation and an anionic counterion and has a neutral charge. As a non-limiting example, if the $CO_2$ stream 128 includes $CO_2$ and the SPM feed stream 130 includes at least one guanidine compound and $H_2O$, $CO_2$ of the $CO_2$ stream 128 reacts with the guanidine compound and the $H_2O$ of the SPM feed stream 130 to form a guanidinium bicarbonate according to the following reversible reaction:

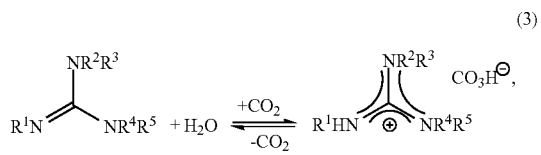

(3)

where $R^1$, $R^2$, $R^3$, $R^4$, $R^5$, and X are as defined above. Accordingly, the $CO_2$ from the $CO_2$ stream 128 becomes effectively captured as the $HCO_3^-$ of the produced guanidinium bicarbonate.

In some embodiments, the $CO_2$ stream 128 includes $CO_2$ and the SPM feed stream 130 includes 1-cyclohexylpiperidine and $H_2O$, and the $CO_2$ of the $CO_2$ stream 128 reacts with the 1-cyclohexylpiperidine and the $H_2O$ of the SPM feed stream 130 to form 1-cyclohexylpiperidinium bicarbonate according to the following reversible reaction:

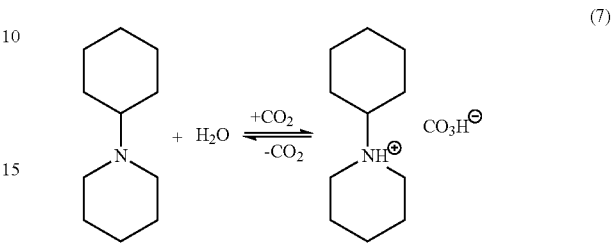

(7)

Accordingly, the $CO_2$ from the $CO_2$ stream 128 becomes effectively captured as the $HCO_3^-$ of the produced 1-cyclohexylpiperidinium bicarbonate.

With continued reference to FIG. 1, the SPM product stream 132 including the polar form of at least one SPM exits the $CO_2$ capture apparatus 106, and may be directed into the electrochemical apparatus 108. The SPM product stream 132 may only include the polar form of the SPM and unreacted solvent (e.g., unreacted $H_2O$); or may the polar form of the SPM, unreacted solvent, and one or more other materials (e.g., unreacted components of the $CO_2$ stream 128, such as unreacted $CO_2$; other unreacted components of the SPM feed stream 130, such as unreacted non-polar form of the SPM and/or unreacted additives (if any)). One or more apparatuses (e.g., heat exchangers, pumps, compressors, expanders, mass flow control devices, etc.) may be employed within the $CO_2$ treatment system 100 to adjust the one or more of the temperature, pressure, and flow rate of the SPM product stream 132 delivered into the electrochemical apparatus 108. In some embodiments, the SPM product stream 132 is delivered into the electrochemical apparatus 108 at a temperature within a range of from about 20° C. to about 30° C. (e.g., about 25° C.), and a pressure within a range of from about 20 pounds per square inch (psi) (137.9 kPa) to about 40 psi (275.8 kPa).

A single (e.g., only one) SPM product stream 132 may be directed into the electrochemical apparatus 108, or multiple (e.g., more than one) SPM product streams 132 may be directed into the electrochemical apparatus 108. If multiple SPM product streams 132 are directed into the electrochemical apparatus 108, each of the multiple SPM product streams 132 may exhibit substantially the same properties (e.g., substantially the same material composition, substantially the same temperature, substantially the same pressure, substantially the same flow rate, etc.), or at least one of the multiple SPM product streams 132 may exhibit one or more different properties (e.g., a different material composition, a different temperature, a different pressure, a different flow rate, etc.) than at least one other of the SPM product streams 132.

With continued reference to FIG. 1, the electrochemical apparatus 108, including the housing structure 112 and the electrolysis cell 114 thereof, is configured and operated to form a reaction product stream 134 including one or more $CO_2$ electrochemical reduction products (and/or derivatives thereof) from the $H_2O$ stream 124 and the SPM product stream 132. The housing structure 112 may exhibit any shape (e.g., a tubular shape, a quadrilateral shape, a spherical shape, a semi-spherical shape, a cylindrical shape, a semi-cylindrical shape, truncated versions thereof, or an irregular shape) and size able to contain (e.g., hold) the electrolysis cell 114 therein, to receive and direct the $H_2O$ stream 124 to the positive electrode 116 of the electrolysis cell 114, to direct the SPM product stream 132 to the negative electrode 118 of the electrolysis cell 114, to direct gaseous $O_2$ formed at the positive electrode 116 of the electrolysis cell 114 away from the electrochemical apparatus 108 as an $O_2$ stream 126, and to direct the $CO_2$ electrochemical reduction products (and/or derivatives thereof) formed at the negative electrode 118 of the electrolysis cell 114 away from the electrochemical apparatus 108 as the reaction product stream 134. In addition, the housing structure 112 may be formed of and include any material (e.g., glass, metal, alloy, polymer, ceramic, composite, combination thereof, etc.) compatible with the operating conditions (e.g., temperatures, pressures, etc.) of the electrochemical apparatus 108.

The housing structure 112 may at least partially define at least one internal chamber 136 at least partially (e.g., substantially) surrounding the electrolysis cell 114. The electrolysis cell 114 may serve as a boundary between a first region 138 (e.g., an anodic region) of the internal chamber 136 configured and positioned to receive the $H_2O$ stream 124 and to direct the $O_2$ stream 126 from the electrochemical apparatus 108, and a second region 140 (e.g., a cathodic region) of the internal chamber 136 configured and positioned receive the SPM product stream 132 and to direct the reaction product stream 134 from the electrochemical apparatus 108.

As shown in FIG. 1, the positive electrode 116 and the negative electrode 118 of the electrolysis cell 114 are electrically coupled to a power source 122, and the a proton-conducting membrane 120 is disposed on and between the positive electrode 116 and the negative electrode 118. The proton-conducting membrane 120 is configured and formulated to conduct $H^+$ from the positive electrode 116 to the negative electrode 118, while electrically insulating the negative electrode 118 from the positive electrode 116 and preventing the migration of gaseous materials (e.g., gaseous $O_2$) therethrough. Electrons (e) generated at the positive electrode 116 may, for example, flow from the positive electrode 116 into a negative current collector, through the power source 122 and a positive electrode current collector, and into negative electrode 118 to facilitate the synthesis of $CO_2$ electrochemical reduction products (and/or derivatives thereof) at the negative electrode 118, as described in further detail below.

The proton-conducting membrane 120 may be formed of and include at least one electrolyte material exhibiting desired ionic conductivity (e.g., $H^+$ conductivity) at the operating temperature of the electrolysis cell 114, such an ionic conductivity greater than or equal to about $10^{-3}$ S/cm (e.g., greater than or equal to about $10^{-2}$ S/cm) at a temperature greater than or equal to about 25° C. (e.g., within a range of from about 25° C. to about 650° C.). In addition, the electrolyte material may be formulated to remain substantially adhered to the positive electrode 116 and the negative electrode 118 at relatively high current densities, such as at current densities greater than or equal to about 0.1 amperes per square centimeter ($A/cm^2$) (e.g., greater than or equal to about 0.5 $A/cm^2$, greater than or equal to about 1.0 $A/cm^2$, greater than or equal to about 2.0 $A/cm^2$, etc.). For example, the proton-conducting membrane 120 may comprise a sulfonated tetrafluoroethylene-based fluoropolymer-copolymer material. Suitable sulfonated tetrafluoroethylene-based fluoropolymer-copolymer membranes are commercially available from numerous sources, such as from DuPont (Wilmington, Del.) under the NAFION® trade name. In some embodiments, the proton-conducting membrane 120 comprises a NAFION® 117 perfluorinated membrane.

The proton-conducting membrane 120 may be substantially homogeneous or may be substantially heterogeneous. As used herein, the term "homogeneous" means amounts of a material do not vary throughout different portions (e.g., different lateral portions, different longitudinal portions) of a structure. Conversely, as used herein, the term "heterogeneous" means amounts of a material vary throughout different portions of a structure. Amounts of the material may vary stepwise (e.g., change abruptly), or may vary continuously (e.g., change progressively, such as linearly, parabolically) throughout different portions of the structure. In some embodiments, the proton-conducting membrane 120 is substantially homogeneous. In additional embodiments, the proton-conducting membrane 120 is heterogeneous. The proton-conducting membrane 120 may, for example, be formed of and include a stack of at least two (e.g., at least three, at least four, etc.) different materials. As a non-limiting example, the proton-conducting membrane 120 may comprise a stack of at least two (e.g., at least three, at least four, etc.) different sulfonated tetrafluoroethylene-based fluoropolymer-copolymer materials.

The proton-conducting membrane 120 may exhibit any desired dimensions (e.g., length, width, thickness) and any desired shape (e.g., a cubic shape, cuboidal shape, a tubular shape, a tubular spiral shape, a spherical shape, a semi-spherical shape, a cylindrical shape, a semi-cylindrical shape, a conical shape, a triangular prismatic shape, a truncated version of one or more of the foregoing, and irregular shape). The dimensions and the shape of the proton-conducting membrane 120 may be selected such that the proton-conducting membrane 120 substantially intervenes between opposing surfaces of the positive electrode 116 and the negative electrode 118, and exhibits an $H^+$ conductivity greater than or equal to about $10^{-3}$ S/cm at a temperature greater than or equal to about 25° C. A thickness of the proton-conducting membrane 120 may be within a range of from about 5 micrometers (μμm) to about 1000 μm, and may at least partially depend on the material composition of the proton-conducting membrane 120.

The positive electrode 116 and the negative electrode 118 may individually be formed of and include at least one material compatible with the material composition of the proton-conducting membrane 120 and the operating conditions (e.g., temperature, pressure, current density, etc.) of the electrolysis cell 114, and facilitating the formation of the reaction product stream 134 and the $O_2$ stream 126 from the $H_2O$ stream 124 and the SPM product stream 132. Accordingly, the material compositions of the positive electrode 116 and the negative electrode 118 may be selected relative to one another, the material composition of the proton-conducting membrane 120, and the operating conditions of the electrolysis cell 114.

As a non-limiting example, if the proton-conducting membrane 120 comprises a sulfonated tetrafluoroethylene-based fluoropolymer-copolymer material, the positive electrode 116 may comprise one or more of metal and an alloy compatible with the sulfonated tetrafluoroethylene-based fluoropolymer-copolymer material; and the negative electrode 118 of the proton-conducting membrane 120 may comprise one or more of metal, an alloy, a metal coated material, an alloy coated material compatible with the sulfonated tetrafluoroethylene-based fluoropolymer-copolymer material. In some embodiments, the proton-conducting membrane 120 comprises a sulfonated tetrafluoroethylene-based fluoropolymer-copolymer material; the positive electrode 116 comprises one or more of platinum (Pt), titanium (Ti), an alloy thereof, or a combination thereof; and the negative electrode 118 comprises a metal-coated carbon material, such as carbon material (e.g., reticulated vitreous carbon) coated with one or more of silver (Ag), copper (Cu), gold (Au), tin (Sn), lead (Pb), and zinc (Zn). The metal coating the carbon material may comprise a plurality of metallic (e.g., pure metal, alloy) particles (e.g., discrete metallic particles). The metallic particles may be nano-sized (e.g., exhibiting an average particle size less than 1 micrometer ($\mu m$), such as less than or equal to 750 nanometers, less than or equal to 500 nanometers, or less than or equal to 250 nm), micro-sized (e.g., exhibiting an average particle size greater than or equal to 1 $\mu m$, such as within a range of from about 1 $\mu m$ to about 50 $\mu m$, within a range of about 1 $\mu m$ to about 25 $\mu m$, within a range of about 1 $\mu m$ to about 10 $\mu m$, or within a range of about 1 $\mu m$ to about 5 $\mu m$). In some embodiments, the metal-coated carbon material comprises reticulated vitreous carbon coated with Ag particles having an average particle size within a range of from about 1 micrometer ($\mu m$) to about 5 $\mu m$.

Optionally, one or more of the positive electrode 116 and the negative electrode 118 may include at least one additional catalyst material thereon, thereover, and/or therein. As used herein, the terms "catalyst material" and "catalyst" each mean and include a material formulated to promote one or more reactions, resulting in the formation of a product. For example, an additional catalyst material may be included on, over, and/or within the material of the positive electrode 116 to accelerate reaction rates within the positive electrode 116 to produce gaseous $O_2$, $H^+$, and $e^-$ from $H_2O$ of the $H_2O$ stream 124. In some embodiments, a Pr—Ni—Fe oxide is provided on, over, and/or within the positive electrode 116 to accelerate oxygen evolution reaction (OER) rates therein. As another example, a catalyst material may be included on, over, and/or within the material of the negative electrode 118 to accelerate reaction rates within the negative electrode 118 to produce a desired product from $H^+$, $e^-$, and one or more of $CO_2$, $CO_2$ electrochemical reduction product(s), and reaction product(s) of $CO_2$ and/or $CO_2$ electrochemical reduction product(s) and one or more other materials. In some embodiments, Cu is provided on, over, and/or within the negative electrode 118 to accelerate reaction rates at the negative electrode 118. In additional embodiments, nano-sized (e.g., having a cross-sectional width or diameter less than about one (1) $\mu m$, such as less than or equal to about 100 nanometers (nm), less than or equal to about 20 nm, or less than or equal to about 10 nm) particles (e.g., Cu particles) are provided on, over, and/or within the negative electrode 118 to promote reaction rates therein.

The positive electrode 116 and the negative electrode 118 may individually exhibit any desired dimensions (e.g., length, width, thickness) and any desired shape (e.g., a cubic shape, cuboidal shape, a tubular shape, a tubular spiral shape, a spherical shape, a semi-spherical shape, a cylindrical shape, a semi-cylindrical shape, a conical shape, a triangular prismatic shape, a truncated version of one or more of the foregoing, and irregular shape). The dimensions and the shapes of the positive electrode 116 and the negative electrode 118 may be selected relative to the dimensions and the shape of the proton-conducting membrane 120 such that the proton-conducting membrane 120 substantially intervenes between opposing surfaces of the positive electrode 116 and the negative electrode 118. Thicknesses of the positive electrode 116 and the negative electrode 118 may individually be within a range of from about 10 $\mu m$ to about 1000 $\mu m$.

As shown in FIG. 1, the buffer structure 119, if present, may be disposed between the proton-conducting membrane 120 and the negative electrode 118. The buffer structure 119 may comprise a porous structure that is compatible with the proton-conducting membrane 120 and the negative electrode 118 under the operating conditions (e.g., temperatures, pressures, flow rates) of the electrochemical apparatus 108, and that facilitates interactions between $H^+$ diffused through the proton-conducting membrane 120 and one or more components (e.g., the polar form of the SPM) of the SPM product stream 132 received into the second region 140 of the internal chamber 136 of the housing structure 112 of the electrochemical apparatus 108. The buffer structure 119 may, for example, comprise a porous polymeric structure, such as a porous polyester structure. In some embodiments, the buffer structure 119 comprises a polyester fabric having a thickness less than or equal to about 200 $\mu m$. In additional embodiments, the electrolysis cell 114 is substantially free of the buffer structure 119 between the proton-conducting membrane 120 and the negative electrode 118. In such embodiments, the negative electrode 118 is directly attached to the proton-conducting membrane 120.

The electrolysis cell 114, including the positive electrode 116, the proton-conducting membrane 120, and the negative electrode 118 thereof, may be formed through conventional processes (e.g., rolling process, milling processes, shaping processes, pressing processes, consolidation processes, etc.), which are not described in detail herein. The electrolysis cell 114 may be mono-faced or bi-faced and may have a prismatic, folded, wound, cylindrical, or jelly rolled configuration. The electrolysis cell 114 may be placed within the housing structure 112 to form the electrochemical apparatus 108, and may be electrically connected to the power source 122.

During use and operation of the electrochemical apparatus 108, the $H_2O$ stream 124 received in the first region 138 of the internal chamber 136 of the housing structure 112 interacts with the positive electrode 116 of the electrolysis cell 114, while the SPM product stream 132 received in the second region 140 of the internal chamber 136 of the housing structure 112 interacts with the negative electrode 118 of the electrolysis cell 114. A potential difference (e.g., voltage) is applied between the positive electrode 116 and the negative electrode 118 of the electrolysis cell 114 by the power source 122 so that as the $H_2O$ of the $H_2O$ stream 124 interacts with the positive electrode 116, H atoms of the gaseous $H_2O$ release their electrons (e) to generate $O_2$ gas ($O_{2(g)}$), $H^+$, and $e^-$ according to the following equation:

$$2H_2O \rightarrow O_{2(g)} + 4H^+ + 4e^- \qquad (4)$$

The generated $H^+$ permeate (e.g., diffuse) across the proton-conducting membrane 120 to the negative electrode 118, the generated $e^-$ are directed to the power source 122 through external circuitry, and the generated $O_{2(g)}$ exits the electrochemical apparatus 108 as the $O_2$ stream 126. At the negative electrode 118, the generated $H^+$ interacts with the bicarbonate ion ($HCO_3^-$) of the polar form of the SPM (e.g., the $HCO_3^-$ of the aminium salt, the bicarbonate ion of the amidinium salt, the bicarbonate ion of the guanidinium salt) to produce $CO_2$ and $H_2O$ according to the following equation:

$$HCO_3^- + H^+ \rightarrow CO_2 + H_2O \qquad (5)$$

At the negative electrode 118, produced $CO_2$ may react with $H_2O$ and $e^-$ received from the power source 122 to produce CO and hydroxyl ions ($OH^-$), and $H_2O$ may react with $e^-$ received from the power source 122 to produce $H_2$ gas and $OH^-$, according to the following equations, respectively:

$$CO_2 + H_2O + 2e^- \rightarrow CO_{(g)} + 2OH^- \qquad (6)$$

$$2H_2O + 2e^- \rightarrow H_{2(g)} + 2OH^- \qquad (7)$$

Thus, a synthesis gas (syngas) including $CO_{(g)}$ and $H_{2(g)}$ may be produced within the second region 140 of the internal chamber 136 of the housing structure 112. Furthermore, produced $OH^-$ may interact with remaining cation (e.g., aminium cation, amidinium cation, guanidinium cation) of the polar form of the SPM (e.g., the aminium salt, the amidinium salt, guanidinium salt) to re-produce the nonpolar form of the SPM (e.g., the amine compound, the amidine compound, the guanidine compound) and $H_2O$, according to one or more of the following equations:

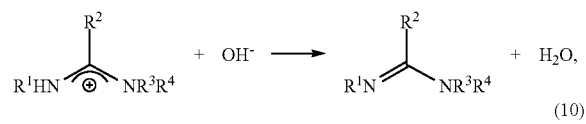

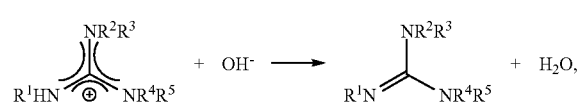

where $R^1$, $R^2$, $R^3$, $R^4$, $R^5$ and X are as defined above.

Optionally, depending at least on the diffusivity (e.g., diffusion rate) of the generated $H^+$ through the proton-conducting membrane 120, $CO_2$ produced at the negative electrode 118 of the electrolysis cell 114 may be reacted with generated $H^+$ exiting the proton-conducting membrane 120 and $e^-$ received from the power source 122 to form one or more products other than CO. By way of non-limiting example, produced $CO_2$ may be reacted with generated $H^+$ and received $e^-$ to produce one or more of formic acid ($CH_2O_2$), methane ($CH_4$), and ethylene ($C_2H_4$) according to the following equations, respectively:

$$CO_2 + 2H^+ + 2e^- \rightarrow CH_2O_2, \qquad (11)$$

$$CO_2 + 8H^+ + 8e^- \rightarrow CH_4 + 2H_2O, \qquad (12)$$

$$CO_2 + 12H^+ + 12e^- \rightarrow C_2H_4 + 4H_2O. \qquad (13)$$

In addition, optionally, products formed from reactions between produced $CO_2$, generated $H^+$, and received $e^-$ at the negative electrode 118 may be reacted with additional generated $H^+$ and additional received $e^-$ to form one or more additional products. As a non-limiting example, $CH_2O_2$ produced at the negative electrode 118 according to the reaction of Equation (11) above may be reacted with additional generated $H^+$ and additional received $e^-$ to produce formaldehyde ($CH_2O$) according to the following equation:

As another non-limiting example, $CH_2O$ produced at the negative electrode 118 according to the reaction of Equation (14) above may be reacted with yet additional generated $H^+$ and yet additional received $e^-$ to produce methanol ($CH_3OH$) according to the following equation:

$$CH_2O + 2H^+ + 2e^- \rightarrow CH_3OH \qquad (15)$$

Although the electrochemical apparatus 108 is depicted as including a single (i.e., only one) electrolysis cell 114 in FIG. 1, the electrochemical apparatus 108 may include any number of electrolysis cells 114. Put another way, the electrochemical apparatus 108 may include a single (e.g., only one) electrolysis cell 114, or may include multiple (e.g., more than one) electrolysis cells 114. If the electrochemical apparatus 108 includes multiple electrolysis cells 114, each of the electrolysis cells 114 may be substantially the same (e.g., exhibit substantially the same components, component sizes, component shapes, component material compositions, component material distributions, component positions, component orientations, etc.) and may be operated under substantially the same conditions (e.g., substantially the same temperatures, pressures, flow rates, etc.), or at least one of the electrolysis cells 114 may be different (e.g., exhibit one or more of different components, different component sizes, different component shapes, different component material compositions, different component material distributions, different component positions, different component orientations, etc.) than at least one other of the electrolysis cells 114 and/or may be operated under different conditions (e.g., different temperatures, different pressures, different flow rates, etc.) than at least one other of the electrolysis cells 114. By way of non-limiting example, one of the electrolysis cells 114 may be configured for and operated under a different temperature (e.g., different operating temperature resulting from a different material composition of one of more components thereof, such as a different material composition of the proton-conducting membrane 120 thereof) than at least one other of the electrolysis cells 114. In some embodiments, two of more electrolysis cells 114 are provided in parallel with one another within the housing structure 112 of the electrochemical apparatus 108, and may individually form a portion of the products directed out of the electrochemical apparatus 108 in the reaction product stream 134.

In addition, although the $CO_2$ treatment system 100 is depicted as including a single (i.e., only one) electrochemical apparatus 108 in FIG. 1, the $CO_2$ treatment system 100 may include any number of electrochemical apparatuses 108. Put another way, the $CO_2$ treatment system 100 may include a single (e.g., only one) electrochemical apparatus 108, or may include multiple (e.g., more than one) electrochemical apparatuses 108. If the $CO_2$ treatment system 100 includes multiple electrochemical apparatuses 108, each of the electrochemical apparatuses 108 may be substantially the same (e.g., exhibit substantially the same components, component sizes, component shapes, component material compositions, component material distributions, component positions, component orientations, etc.) and may be operated under substantially the same conditions (e.g., substantially the same temperatures, pressures, flow rates, etc.), or at least one of the electrochemical apparatus 108 may be different (e.g., exhibit one or more of different components, different component sizes, different component shapes, different component material compositions, different component material distributions, different component positions, different component orientations, etc.) than at least one other of the electrochemical apparatuses 108 and/or may be operated under different conditions (e.g., different temperatures, different pressures, different flow rates, etc.) than at least one other of the electrochemical apparatuses 108. By way of non-limiting example, one of the electrochemical apparatuses 108 may be configured for and operated under a different temperature (e.g., a different operating temperature resulting from a different material composition of one of more components of an electrolysis cell 114 thereof, such as a different material composition of the proton-conducting membrane 120 thereof) than at least one other of the electrochemical apparatuses 108. In some embodiments, two of more electrochemical apparatuses 108 are provided in parallel with one another. Each of the two of more electrochemical apparatuses 108 may individually receive an $H_2O$ stream 124 and a SPM product stream 132 and may individually form a reaction product stream 134. In additional embodiments, two of more electrochemical apparatuses 108 are provided in series with one another. One of the two of more electrochemical apparatuses 108 may receive an $H_2O$ stream 124 and a SPM product stream 132 and may form an initial reaction product stream 134 therefrom, and another of the two of more electrochemical apparatuses 108 may receive another $H_2O$ stream 124 and the initial reaction product stream 134 (e.g., as a substitute for another SPM product stream 132) and may form another reaction product stream 134 therefrom.

With continued reference to FIG. 1, the reaction product stream 134 exits the second region 140 of the internal chamber 136 of the housing structure 112 of the electrochemical apparatus 108 and may be directed into the separation apparatus 110. The reaction product stream 134 may comprise a multi-phase stream (e.g., a stream including a gaseous phase and at least one liquid phase), and may include the non-polar form of at least one SPM (e.g., one or more of a tertiary amine, an amidine, and a guanidine), liquid $H_2O$, and one or more of at least one reaction product (e.g., CO, $CH_2O_2$, $CH_4$, $C_2H_4$) formed through the electrochemical reduction of $CO_2$, at least one reaction product (e.g., $CH_2O$, $CH_3OH$) formed through the electrochemical reduction of at least one $CO_2$ derivative, and at least one reaction product (e.g., $H_2$) formed through the electrochemical reduction of $H_2O$. The reaction product stream 134 may also include $CO_2$ and/or one or more unreacted materials (e.g., unreacted non-polar form of at least one SPM) of the SPM product stream 132. One or more apparatuses (e.g., heat exchangers, pumps, compressors, expanders, mass flow control devices, etc.) may be employed within the $CO_2$ treatment system 100 to adjust the one or more of the temperature, pressure, and flow rate of the reaction product stream 134 delivered into the separation apparatus 110.

A single (e.g., only one) reaction product stream 134 may be directed into the separation apparatus 110, or multiple (e.g., more than one) reaction product streams 134 may be directed into the separation apparatus 110. If multiple reaction product streams 134 are directed into the separation apparatus 110, each of the multiple reaction product streams 134 may exhibit substantially the same properties (e.g., substantially the same material composition, substantially the same temperature, substantially the same pressure, substantially the same flow rate, etc.), or at least one of the multiple reaction product streams 134 may exhibit one or more different properties (e.g., a different material composition, a different temperature, a different pressure, a different flow rate, etc.) than at least one other of the reaction product streams 134.

The separation apparatus 110 may comprise at least one device or apparatus configured and operated to separate (e.g., remove) a liquid phase of the reaction product stream 134 from a gaseous phase of the reaction product stream 134. In some embodiments, the separation apparatus 110 comprises at least one distillation column. As shown in FIG. 1, the separation apparatus 110 may be configured and operated to produce a gaseous product stream 142 and a liquid product stream 144.

The gaseous product stream 142 exiting the separation apparatus 110 may include one or more gaseous products formed through the electrochemical reduction of one or more of $CO_2$, $CO_2$ electrochemical reduction products, and $H_2O$ in the electrochemical apparatus 108. By way of non-limiting example, the gaseous product stream 142 may include one or more of CO gas, $H_2$ gas, $CH_4$ gas, $C_2H_4$ gas, and $CH_2O$ gas. The gaseous product stream 142 may also include one or more other gaseous materials, such as one or more of gaseous $H_2O$, gaseous $CO_2$, and at least one inert gas (e.g., $N_2$ gas, a noble gas). In some embodiments, the gaseous product stream 142 comprises a syngas including a mixture of CO gas and $H_2$ gas. The syngas may also include one or more of $CO_2$ and $CH_4$. By way of non-limiting example, the gaseous product stream 142 may comprise a syngas including from about 10 wt % CO to about 30 wt % CO, from about 60 wt % $H_2$ to about 80 wt % $H_2$, from about 0 wt % $CO_2$ to about 15 wt % $CO_2$, and from about 0 wt % $CH_4$ to about 5 wt % $CH_4$. The gaseous product stream 142 may be utilized, further processed, and/or disposed of as desired.

The liquid product stream 144 exiting the separation apparatus 110 may include the non-polar form of at least one SPM (e.g., one or more of a tertiary amine, an amidine, and a guanidine), liquid $H_2O$, and, optionally, one or more liquid products (e.g., $CH_2O_2$, $CH_3OH$) formed through the electrochemical reduction of one or more of $CO_2$ and $CO_2$ reduction products in the electrochemical apparatus 108. In some embodiments, the gaseous product stream 142 comprises a mixture of liquid $H_2O$ and one or more of a tertiary amine compound, an amidine compound, and a guanidine compound. As shown in FIG. 1, the liquid product stream 144 may be directed (e.g., recycled) into one or more of the $CO_2$ capture apparatus 106, the SPM feed stream 130, and the SPM source 105 for use in repeating the process described above. The non-polar form of at least one SPM and the liquid $H_2O$ from the liquid product stream 144 may, for example, be introduced to additional $CO_2$ from the $CO_2$ stream 128 to form an additional amount of the polar form of at least one SPM, which may then be directed to and acted upon in the electrochemical apparatus 108 to produce additional reaction products (e.g., additional $CO_2$ and $H_2O$ electrochemical reduction products, such as additional syngas) in the manner previously described above. In embodiments where the liquid product stream 144 includes materials other than the non-polar form of at least one SPM and liquid $H_2O$ (e.g., liquid products formed through the electrochemical reduction of one or more of $CO_2$ and $CO_2$ reduction products), the liquid product stream 144 may be subjected to one or more additional separation processes (e.g., fractional distillation, steam distillation, vacuum distillation, flash evaporation, catalytic cracking, etc.) to remove one or more of the materials from the liquid product stream 144 prior to directing the liquid product stream 144 into the $CO_2$ capture apparatus 106, the SPM feed stream 130, and/or the SPM source 105. Materials separated from the liquid product stream 144 may be utilized or disposed of as desired.

The methods, systems (e.g., the $CO_2$ treatment system 100), and apparatuses (e.g., the $CO_2$ capture apparatus 106; the electrochemical apparatus 108, including the electrolysis cell 114 thereof) of the disclosure facilitate simple and efficient capture, transport, and conversion of $CO_2$ into one or more desirable products. The methods, systems, and apparatuses of the disclosure reduce one or more of the time, costs, and energy (e.g., thermal energy, electrical energy, etc.) required to capture and transport $CO_2$ (e.g., $CO_2$ gas) and to synthesize one or more desirable products from $CO_2$ relative to conventional methods, systems, and apparatuses. Accordingly, the methods, systems, and apparatuses of the disclosure may be more efficient, durable, and reliable that conventional methods, conventional systems, and conventional apparatuses of capturing and transporting $CO_2$ and of synthesizing one or more desirable products from $CO_2$.

The following examples serve to explain embodiments of the disclosure in more detail. These examples are not to be construed as being exhaustive or exclusive as to the scope of the disclosure.

EXAMPLES

Example 1—Sample System Configuration and Operation

1-Cyclohexylpiperidine (CHP) was tested for the capture and electrochemical reduction of $CO_2$ gas. Deionized $H_2O$ and CHP were used for the capture of $CO_2$ in a gas diffusion membrane apparatus permitting the continuous production of 1-cyclohexylpiperidinium bicarbonate (CHP—$H_2CO_3$) solutions. A $CO_2$ gas stream and a SPM feed stream including water and CHP were introduced to one another in the gas diffusion membrane apparatus with gas and liquids fed in opposite sides of a gas diffusion membrane. The gas diffusion membrane provided a mass transfer area permitting the diffusion of $CO_2$ molecules through the gas diffusion membrane and into a SPM feed stream. The produced CHP—$H_2CO_3$ solution was recirculated in the gas diffusion membrane apparatus until a homogenous SPM product stream comprising an aqueous 3.0 M CHP—$H_2CO_3$ solution was achieved. $CO_2$ gas capture was performed at room temperature. Concentrations of the produced CHP—$H_2CO_3$ were measured using an Agilent 7890 GC equipped with a 7693 auto-sampler and a flame ionization detector (FID).

Electrochemical reduction of captured $CO_2$ in the SPM feed stream (in the form of CHP—$H_2CO_3$) was performed in a 10 $cm^2$ electrolysis cell station (electrochemical apparatus) manufactured by Fuel Cell technology, Inc. (Albuquerque, N. Mex.) customized with titanium (Ti) plate current collectors (end plates) and connected to a BK Precision 1739 DC power supply. The electrolysis cell station included an electrolysis cell comprising a NAFION® 117 proton exchange membrane (PEM); a positive electrode (anode) formed of platinum (Pt)-plated, sintered Ti on a first side of the NAFION® 117 PEM; an ultra-thin (178 µm) polyester fabric on a second, opposing side of the NAFION® 117 PEM; and a negative electrode (cathode) formed of a catalyst coated, reticulated vitreous carbon (RVC) foam (80 nominal number of pores per inch (2.54 cm) of foam, 10 $cm^2$, 1.5 mm thick) on the ultra-thin polyester fabric. To prepare the catalyst coating of the negative electrode, silver (Ag) powder (1 µm to 3 µm average particle size, Alfa Aesar) was mixed in a solution including 2-propanol, NAFION® perfluorinated resin solution (5%, Aldrich), and polytetrafluoroethylene (PTFE) preparation (60%, Aldrich), to reach a final catalyst composition of 80 wt % Ag, 10 wt % NAFION®, and 10 wt % PTFE. The negative electrode had a total Ag loading of 25 mg $cm^{-2}$.

A Master Flex C/L peristaltic pump was used to recirculate anolyte (aqueous 1M $H_2SO_4$ solution) in a first (anode) chamber of the electrolysis cell station through a serpentine flow pattern engraved in a Ti current collector. In a second (cathode) chamber of the electrolysis cell station, a cathode current collector was modified by removing the flow channels and replacing them with a hollow compartment that could fit the negative electrode. 15 mL of catholyte comprising the produced CHP—$H_2CO_3$ solution of the homogenous SPM product stream was recirculated to flood the second chamber, and was directed into a recirculation reservoir that served as a phase separator, using a bench-top Cole Parmer gear pump system. All of the $CO_2$ added to the electrolysis cell station came from CHP—$H_2CO_3$ solution of the homogenous SPM product stream, and no additional $CO_2$ gas was added directly to the electrolysis cell station and/or to the CHP—$H_2CO_3$ solution during operation. Once a desired current was applied, the negative electrode (cathode) side of the electrolysis cell station was allowed to self-pressurize by the gases produced at in the second chamber. The pressure on the negative electrode side was manually controlled using a needle valve and the gases were collected in a Restek Multilayer bag, for gas chromatography (GC) analysis. Electrochemical reduction experiments were performed at different current densities from 25 to 100 mA $cm^{-2}$, back pressures of 0, 137.9, and 275.9 KPa (0, 20, and 40 psig), and constant temperature of 25° C. Gases produced during the electrochemical reduction of $CO_2$ were analyzed in a Hewlett Packard 5890 GC equipped with two TCD detectors and two columns. A molecular sieve 5A and argon as gas carrier were used for the detection and quantification of CO, while a capillary column 2C D-poraPLOTU and helium gas carrier were used for the detection and quantification of $CO_2$. Finally, the volume of collected gas was measured using a Hamilton, Co. model s-1000 syringe. From the product analysis, syngas compositions, faradaic efficiencies (FE), and $CO_2$ conversions were determined.

Example 2—$CO_2$ Conversion at Different Back Pressures and Constant Current Density $CO_2$ conversion tests based on the sample system configuration described in Example 1 were performed at constant current density of 100 mA $cm^{-2}$ over 30 min at 0 KPa (0 psig) and 137.9 KPa (20 psig) negative electrode (cathode) side back pressure. Analysis of the produced gases demonstrated the presence of CO and an $H_2$ as products of CHP—$H_2CO_3$ solution electrolysis, as well as the presence of $CO_2$ released from the CHP—$H_2CO_3$ solution. A reaction product stream exiting the electrolysis cell station exhibited a liquid portion and a gaseous portion. In the liquid portion, two liquid phases were observed. A top liquid phase comprised CHP, and a bottom liquid phase comprised an aqueous solution including unreacted CHP—$H_2CO_3$. In the gaseous portion, $H_2$ gas was the primary component, and low CO Faradaic efficiencies (FE) of 1.1% and 2.9% were observed at 0 KPa (0 psig) and 137.9 KPa (20 psig), respectively. Higher amounts of $CO_2$ were released when no back pressure was applied. The results suggest a beneficial effect on the back pressure possibly re-dissolving unreacted $CO_2$, hence increasing the efficiency for CO production. During the operation the cell potential varied from ca 5.5 V to 4.5 V. The high cell potential (electrode polarization induced by the low ionic conductivity) was then attributed to be one of the main causes.

Figure 2:
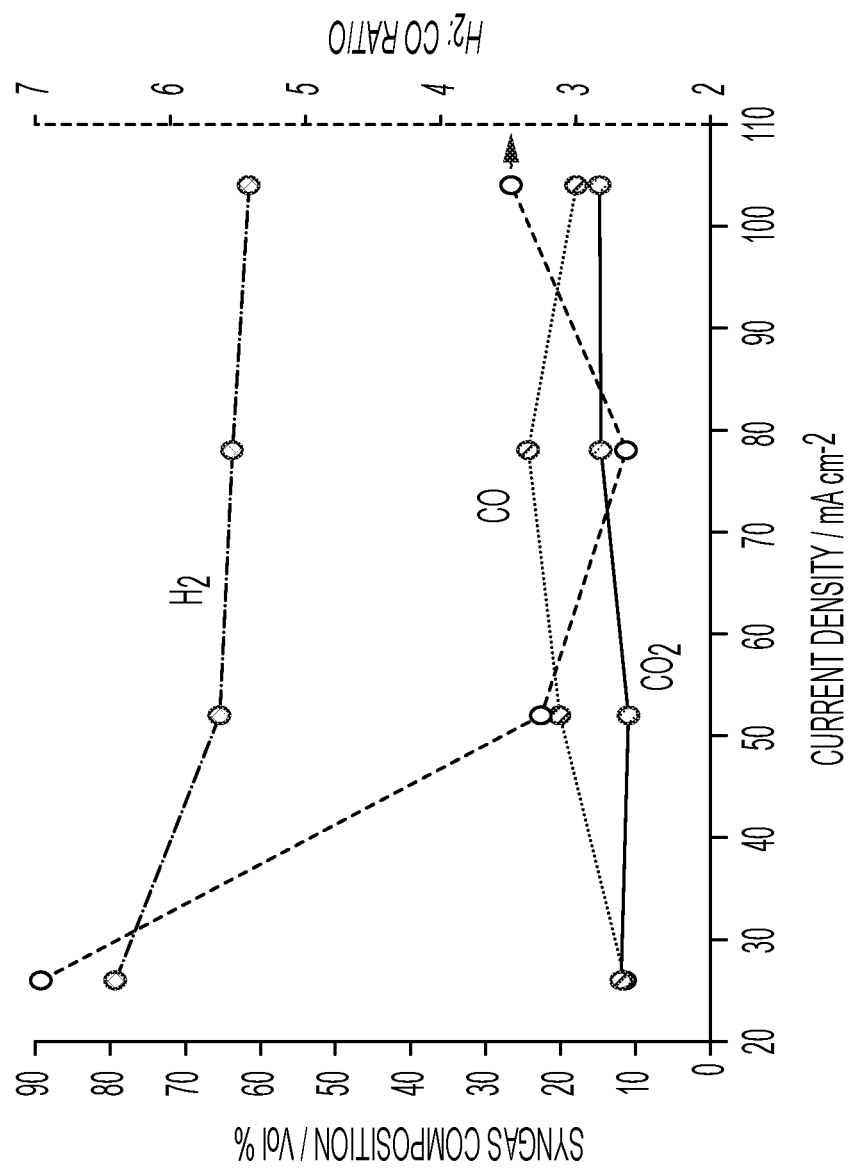
FIG. 2 is a graphical representation of the results described in Example 3.

Example 3—$CO_2$ Conversion at Different Current Densities and Constant Back Pressure $CO_2$ conversion tests based on the system configuration described in Example 1 were performed using 137.9 KPa (20 psig) back pressure and current densities from 26 to 104 mA cm$^{-2}$. FIG. 2 shows the composition of syngas produced during the electrolysis of the CHP—$H_2CO_3$ solution. Similar charges were aimed for all the experiments at different current densities. Hence, the test at 52 mA cm$^{-2}$ was run twice longer than the test at 104 mA cm$^{-2}$. Higher CO concentration was obtained at 78 mA cm$^{-2}$, which corresponded to a $H_2$:CO ratio of 2.6. The amount of $CO_2$ released from the CHP—$H_2CO_3$ solution increased as the current increased. Slow release of $CO_2$ at low current densities may affect the $CO_2$ availability for reaction and, therefore, the reaction yields at low current densities. At 104 mA cm$^{-2}$, higher electrode polarization may be attributed to the decrease in the CO yield. The syngas concentration profile also shows that, except for the process at 26 mA cm$^{-2}$, the $CO_2$ concentration in the produced gas is lower than the amount of $CO_2$. The results show that syngas can be directly produced from a CHP—$H_2CO_3$ solution, eliminating the requirement of downstream separations.

Figure 3:
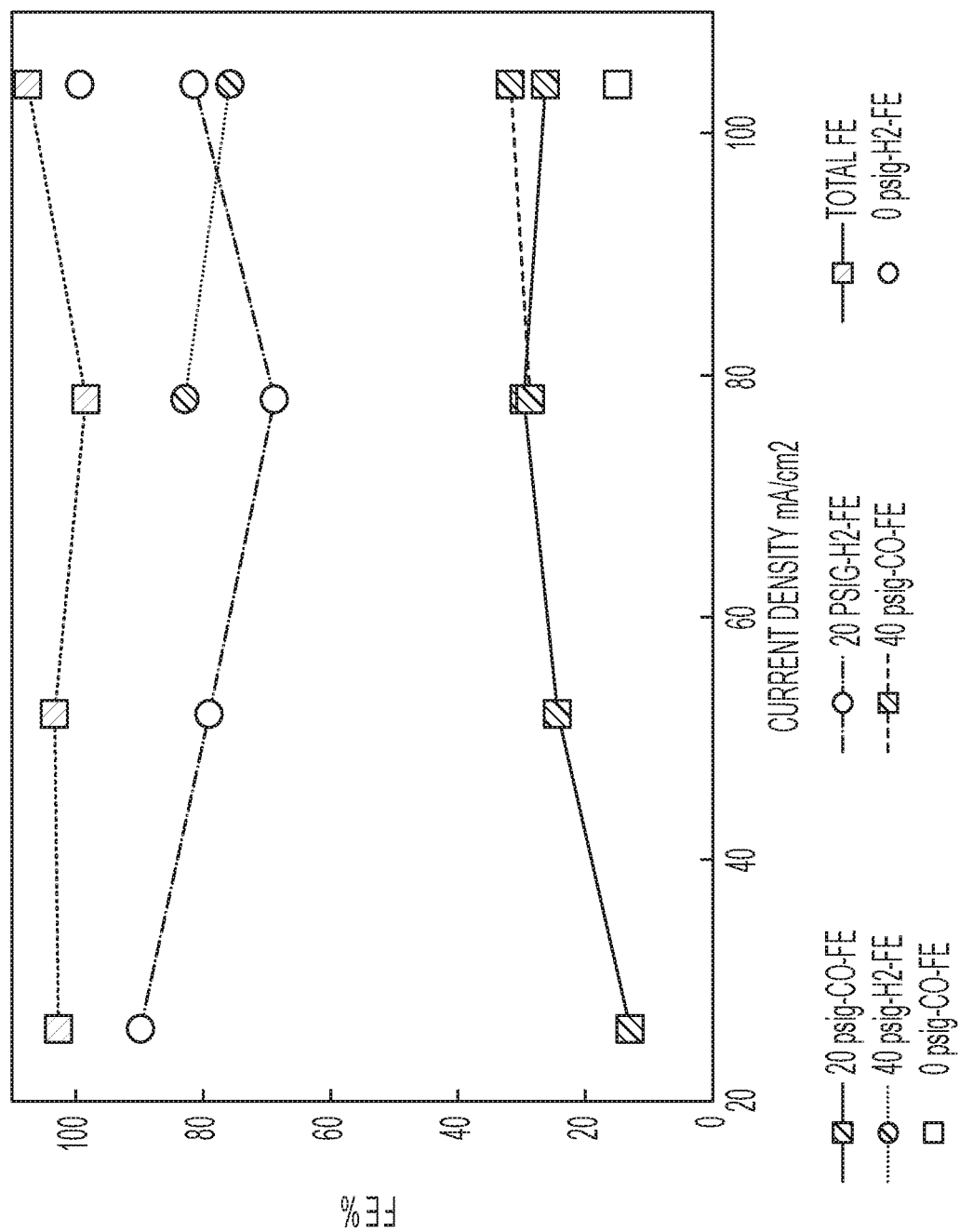
FIGS. 3 and 4 are graphical representations of the results described in Example 4.

Example 4—Syngas Faraday Efficiencies and $CO_2$ Conversion at Different Current Densities and Different Back Pressures Faraday Efficiencies (FE) of syngas produced using the system configuration described in Example 1 were determined at current densities and different back pressures. The results are shown in FIG. 3. The results show that at 104 mA cm$^{-2}$ the CO FE increased over 20% with an increase in the back pressure from 137.9 KPa (20 psig) to 275.9 KPa (40 psig). Over 100% increase can be observed when the FE of CO at 0 KPa (0 psig) and 275.9 KPa (40 psig) are compared. An 8.5% increase in the FE was also observed for the 75 mA cm$^{-2}$ when the back pressure was increased from 137.9 KPa (20 psig) to 275.9 KPa (40 psig). These results show the beneficial effect of the back pressure in the efficiency of the electrochemical reduction of $CO_2$. It is also observed in FIG. 3 that the sum of CO and $H_2$ FEs are close to 100% for all the experimental conditions. Hence, no significant quantities of other $CO_2$ reduction products (e.g., formate) are expected.

Figure 4:
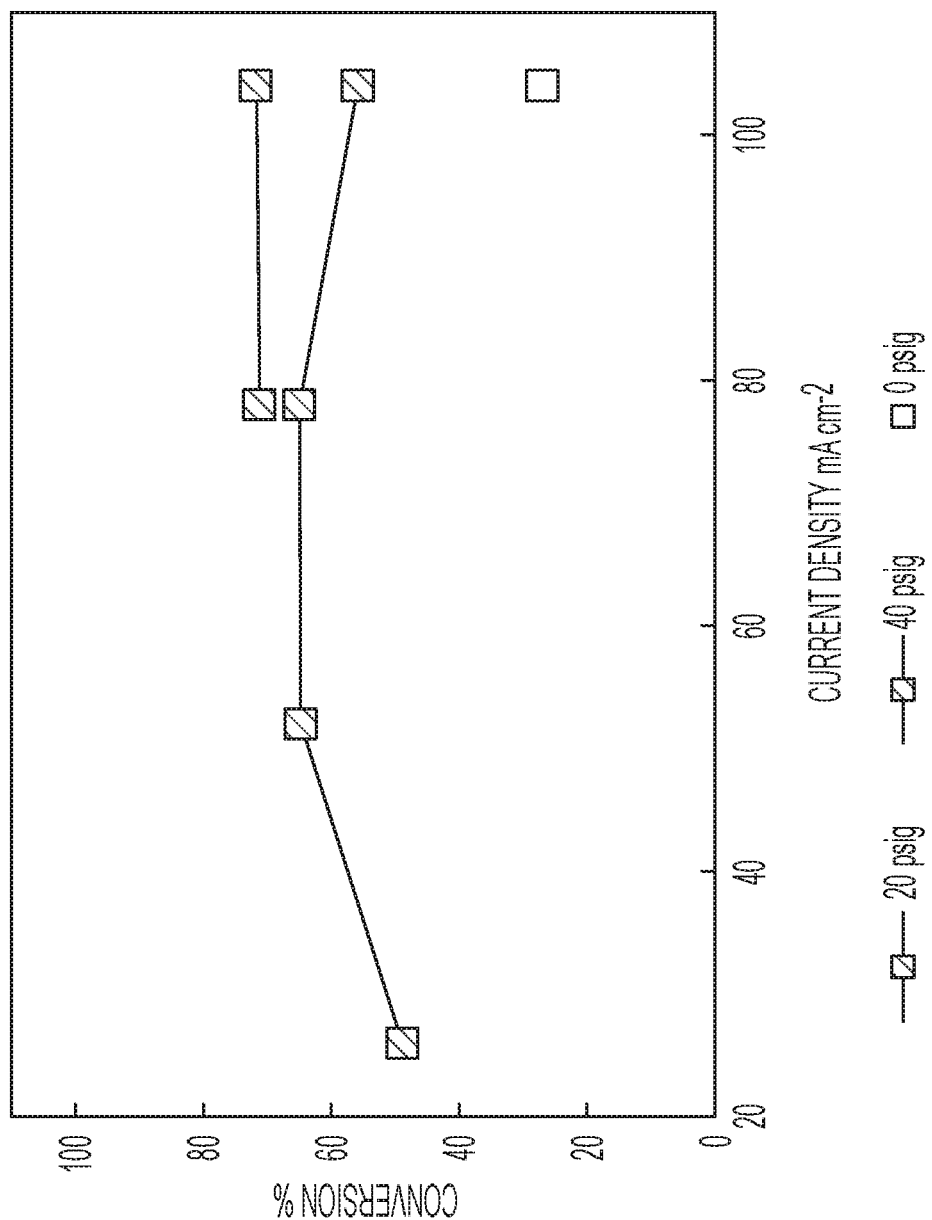

In addition, employing an assumption that the only products formed during the electrolysis of the CHP—$H_2CO_3$ solution were CO and $H_2$, $CO_2$ conversions were calculated based on the amount of $CO_2$ released from the CHP—$H_2CO_3$ solution during the test (unreacted $CO_2$+$CO_2$ converted to CO). The results are shown on FIG. 4. The results show that $CO_2$ conversions and yields were as high as 71.7% during the electrochemical production of syngas from $CO_2$ captured in the CHP—$H_2CO_3$ solution at 104 mA cm$^{-2}$, 275.9 KPa (40 psig), and 25° C. For these conditions, the measured $H_2$:CO ratio was 2.4.

Example 5—Syngas Composition and $CO_2$ Conversion Over Time

Figure 5:
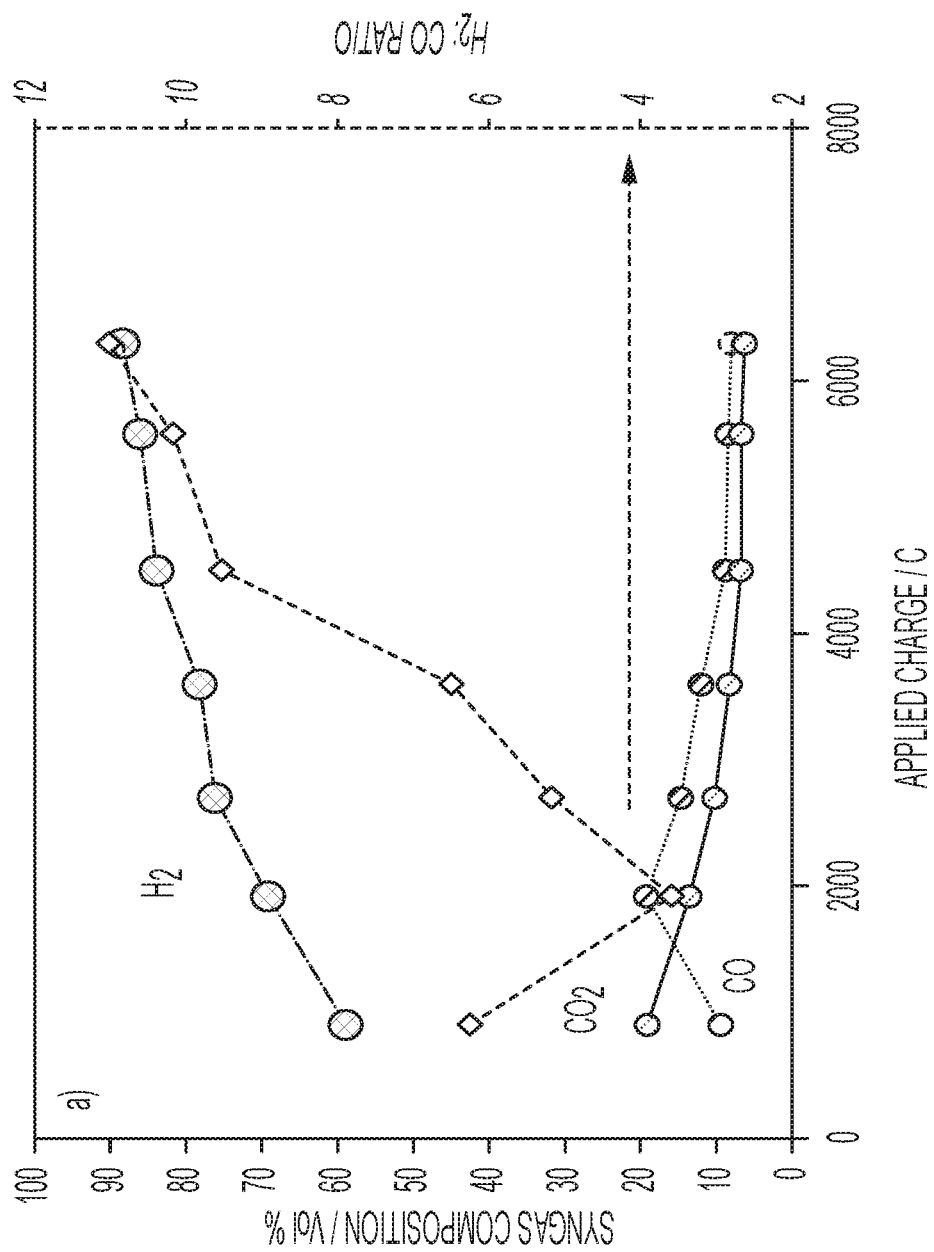
FIGS. 5 and 6 are graphical representations of the results described in Example 5.
Figure 6:
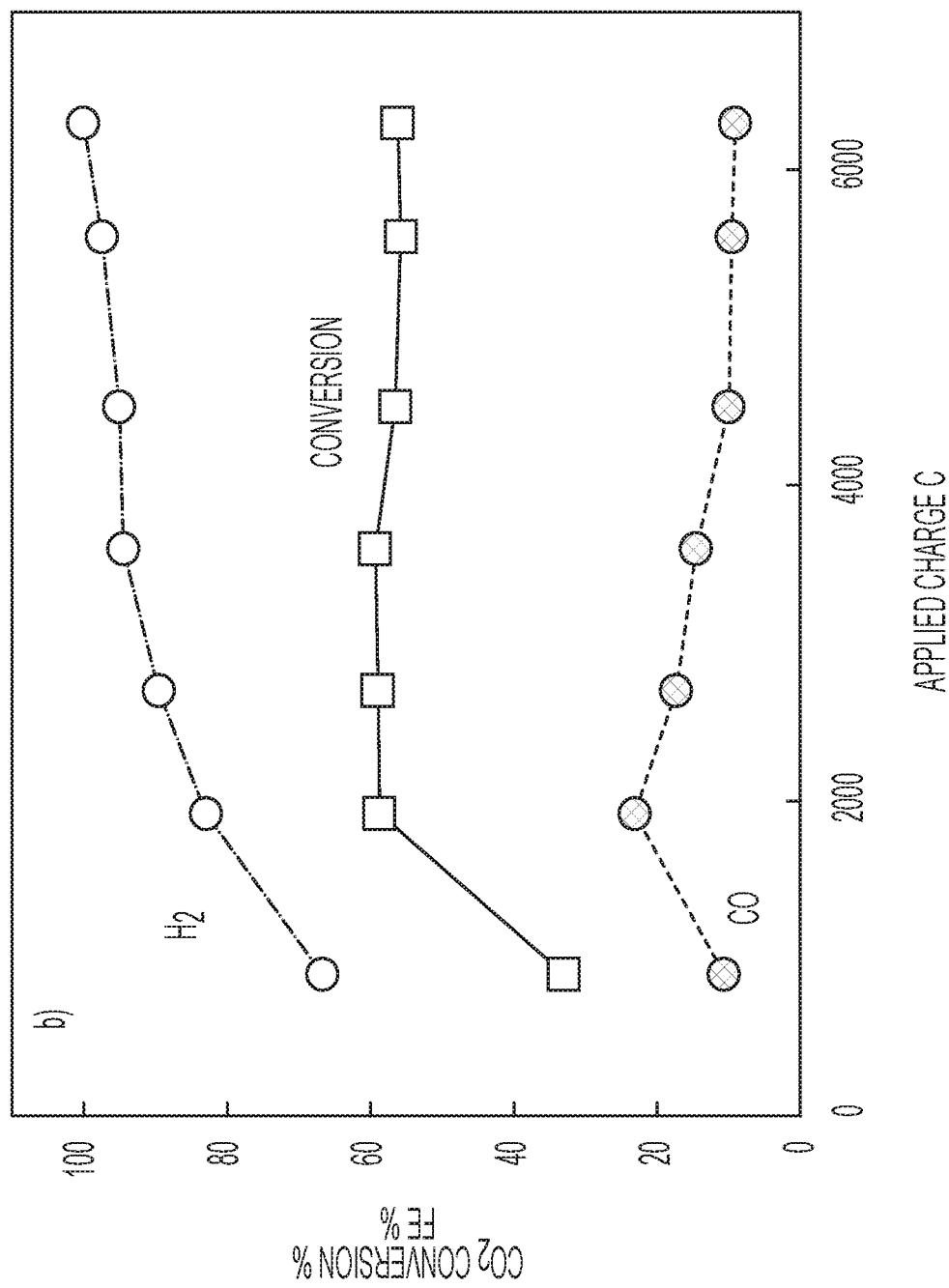

A transient performance analysis was performed to evaluate the performance of the system configuration described in Example 1 and the characteristics of syngas produced thereby over an extended period of time (105 min). For this purpose, the system was run at 100 mA cm$^{-2}$, 275.9 KPa (40 psig), and 25° C., collecting samples every 15 minutes for GC analysis. The CHP—$H_2CO_3$ solution was kept on recyrculation and without external additions of fresh solution. The results are shown in FIGS. 5 and 6. FIG. 5 is a graph showing syngas composition and $H_2$:CO ratio as a function of applied charge. FIG. 6 shows is a graph showing $CO_2$ convention as a function of applied charge.

The results depicted in FIG. 5 indicate that at the beginning, while the process reaches the desired operating pressure and builds an adequate concentration of free $CO_2$, CO production efficiencies are low. Close to 13% of the volume of gas collected during the first sample corresponded to air displaced from the system as electrochemically generated gas started evolving. The highest $CO_2$ reduction efficiency was measured for the second gas sample after stabilization of the pressure in the system. Then the CO yield starts decreasing, $H_2$ increases, following the decrease of $CO_2$ available for reaction. Decrease in performance with time can be explained by a decrease of CHP—$H_2CO_3$ concentration in the recirculated solution. Dilution of the CHP—$H_2CO_3$ concentration is enhanced by the water transferred from the positive electrode (anode) due to electro-osmotic drag.

Figure 7:
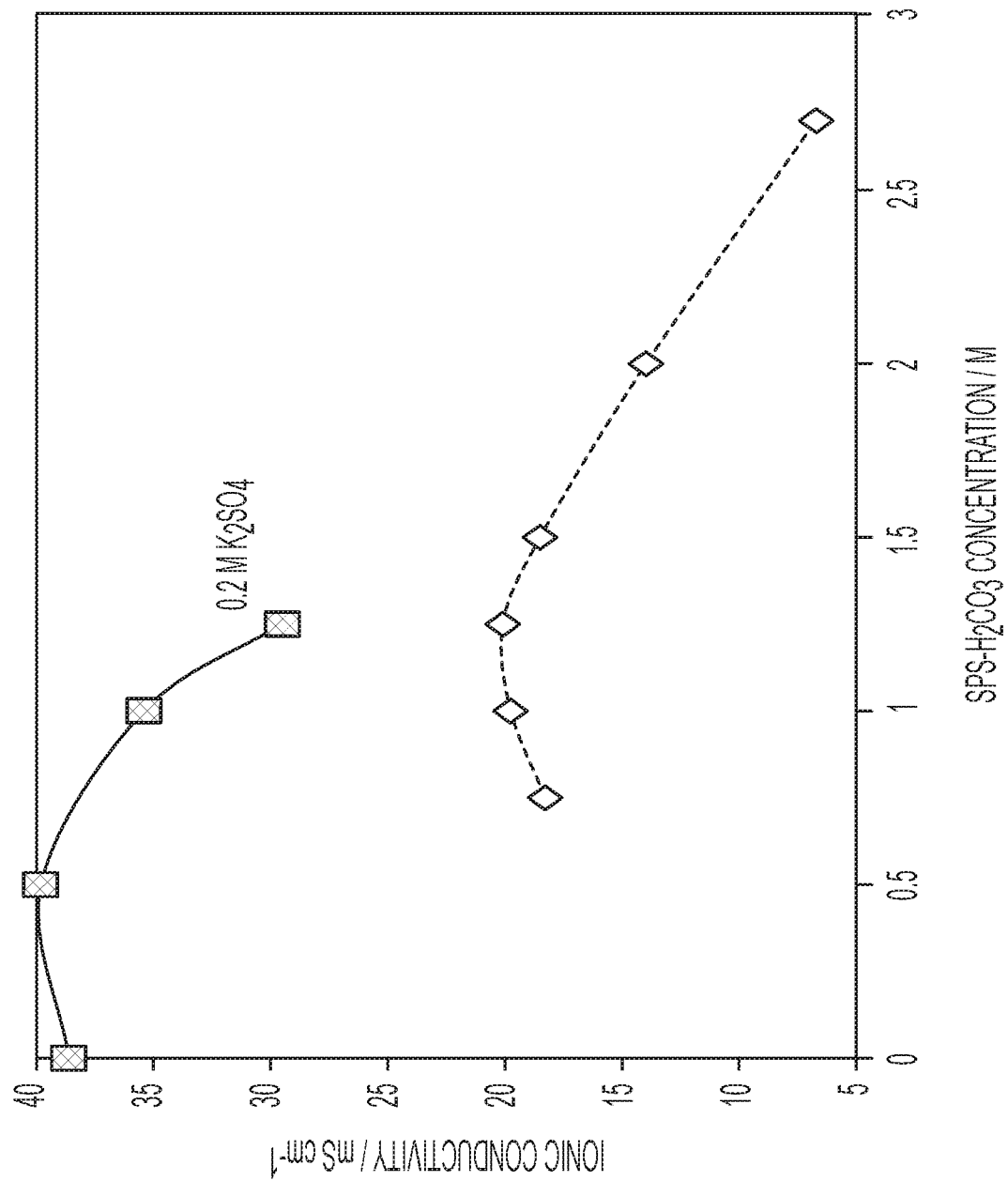
FIG. 7 is a graphical representation of the results described in Example 6.

In addition, as shown in FIG. 6, $CO_2$ conversion remained fairly stable, with a slight 4.3% decrease over a 90 min period (plot points two and four in FIG. 7). The fact that the $CO_2$ conversion remains stable during the operation supports the conclusion that decrease in CO yield during time is likely caused by the depletion of captured $CO_2$ rather than catalyst deactivation. A continuous process operation, continuously feeding fresh CHP—$H_2CO_3$ solution and continuously removing spent solution may allow the continuous production of syngas with stable compositions.

Example 6—Effect of Supporting Electrolyte Additive on the Ionic Conductivity of a CHP—$H_2CO_3$ Solution The effect of the addition of a supporting electrolyte on the ionic conductivity of a CHP—$H_2CO_3$ solution was investigated. $K_2SO_4$ was tested. Diluted CHP—$H_2CO_3$ solutions with 0.2 M $K_2SO_4$ were prepared, and ionic conductivity was measured. The results are shown in FIG. 7. As shown in FIG. 7, a 47 percent increase in ionic conductivity was observed for a 1.25 M CHP—$H_2CO_3$ solution with 0.2 M $K_2SO_4$. However, close to a 10 fold increase in CO production and FE were obtained during electrochemical reduction experiments.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalent. For example, elements and features disclosed in relation to one embodiment may be combined with elements and features disclosed in relation to other embodiments of the disclosure.

What is claimed is:

1. A method of electrochemically reducing $CO_2$, comprising:

introducing a first feed stream comprising $H_2O$ to a positive electrode of an electrolysis cell comprising the positive electrode, a negative electrode, and a proton-conducting membrane between the positive electrode and the negative electrode;

directing a second feed stream comprising additional $H_2O$ and a non-polar form of a switchable polarity material into a $CO_2$ capture apparatus;

directing a third feed stream comprising $CO_2$ into the $CO_2$ capture apparatus to interact with the second feed stream and form a first product stream comprising the additional $H_2O$ and a polar form of the switchable polarity material;

introducing the first product stream to the negative electrode of the electrolysis cell; and applying a potential difference between the positive electrode and the negative electrode of the electrolysis cell to generate hydrogen ions from the $H_2O$ that diffuse through the proton-conducting membrane to convert the polar form of the switchable polarity material into $CO_2$ and the non-polar form of the switchable polarity material and to form one or more products from the produced $CO_2$ and the additional $H_2O$.

2. The method of claim 1, further comprising:
selecting the non-polar form of the switchable polarity material of the second feed stream to comprise one or more of a tertiary amine compound, an amidine compound, and a guanidine compound.

3. The method of claim 2, wherein directing a third feed stream comprising $CO_2$ into the $CO_2$ capture apparatus comprises to interact with the second feed stream and form a first product stream comprises reacting the $CO_2$ of the third feed stream with the additional $H_2O$ and the one or more of a tertiary amine compound, an amidine compound, and a guanidine compound of the second feed stream to form one or more an aminium bicarbonate, an amidinium bicarbonate, and a guanidinium bicarbonate.

4. The method of claim 1, further comprising selecting the $CO_2$ capture apparatus to comprise a gas diffusion membrane apparatus.

5. The method of claim 1, further comprising selecting the electrolysis cell to further comprise a porous buffer structure between the proton-conducting membrane and the negative electrode.

6. The method of claim 5, further comprising selecting the porous buffer structure to comprise a polymeric fabric.

7. The method of claim 1, further comprising:
selecting the proton-conducting membrane of the electrolysis cell to comprise a sulfonated tetrafluoroethylene-based fluoropolymer-copolymer material;
selecting the positive electrode of the electrolysis cell to comprise one or more of Pt, Ti, and an alloy thereof; and
selecting the negative electrode of the electrolysis cell to comprise a metal-coated carbon material.

8. The method of claim 7, wherein selecting the negative electrode of the electrolysis cell to comprise a metal-coated carbon material comprises selecting the negative electrode to comprise reticulated vitreous carbon coated with metallic particles comprising one or more of Ag, Cu, Pb, Sn, Zn, Au.

9. The method of claim 1, further comprising:
directing a second product stream comprising the non-polar form of the switchable polarity material and the one or more products away from the electrolysis cell and into a separation apparatus; and
separating a gaseous phase of the second product stream from a liquid phase of the second product stream within the separation apparatus, the liquid phase comprising the non-polar form of the switchable polarity material.

10. The method of claim 9, further comprising directing the separated liquid phase of the second product stream into the $CO_2$ capture apparatus to interact with additional $CO_2$ in the $CO_2$ capture apparatus and form an additional amount of the polar form of the switchable polarity material.

11. A method of electrochemically reducing $CO_2$, comprising:
reacting gaseous $CO_2$ with a mixture of at least one tertiary amine and $H_2O$ to form an aqueous tertiary aminium bicarbonate solution;
introducing the aqueous tertiary aminium bicarbonate solution to a negative electrode of an electrolysis cell while introducing additional $H_2O$ to a positive electrode of the electrolysis cell, the electrolysis cell comprising the negative electrode, the positive electrode, a proton-conductive membrane between the negative electrode and the positive electrode, and a buffer structure between the negative electrode and the proton-conductive membrane; and
activating the electrolysis cell to convert a portion of the aqueous tertiary aminium bicarbonate solution into the at least one tertiary amine and a synthesis gas comprising CO and $H_2$.

12. The method of claim 11, wherein reacting gaseous $CO_2$ with a mixture of at least one tertiary amine and $H_2O$ to form at aqueous tertiary aminium bicarbonate solution comprising reacting the gaseous $CO_2$ with 1-cyclohexylpiperidine and liquid $H_2O$ to form an aqueous 1-cyclohexylpiperidinium bicarbonate solution.

13. The method of claim 11, wherein activating the electrolysis cell comprises applying a potential difference between the positive electrode and the negative electrode to generate hydrogen ions from the additional $H_2O$ that diffuse through the proton-conducting membrane and into the aqueous tertiary aminium bicarbonate solution at the negative electrode to form a multi-phase mixture comprising a gaseous phase including the synthesis gas and a liquid phase including the at least one tertiary amine.

14. The method of claim 11, further comprising:
separating the synthesis gas from a liquid material comprising 1-cyclohexylpiperidine and liquid $H_2O$; and
reacting the liquid material with additional $CO_2$ to form an additional aqueous tertiary aminium bicarbonate solution.

15. A $CO_2$ treatment system, comprising:
an $H_2O$ source;
a $CO_2$ source;
a source of a non-polar form of a switchable polarity material;
a $CO_2$ capture apparatus downstream of the $CO_2$ source and the source of the non-polar form of the switchable polarity material, the $CO_2$ capture apparatus configured to effectuate the formation of a polar form of the switchable polarity material from reactions between $CO_2$ and the non-polar form of the switchable polarity material; and
an electrochemical apparatus downstream of the $CO_2$ capture apparatus and the $H_2O$ source, the electrochemical apparatus comprising:
a housing structure configured and positioned to receive an $H_2O$ stream from the $H_2O$ source into a first region of an internal chamber thereof and to receive another stream comprising the polar form of the switchable polarity material from the $CO_2$ capture apparatus into a second region of the internal chamber thereof; and an electrolysis cell within the internal chamber of the housing structure, and comprising:
   a positive electrode adjacent the first region of the internal chamber;
   a negative electrode adjacent the second region of the internal chamber;
   a sulfonated tetrafluoroethylene-based fluoropolymer-copolymer membrane between the positive electrode and the negative electrode; and
   a buffer structure comprising a porous polyester fabric configured to facilitate interactions between hydrogen ions diffused through the sulfonated tetrafluoroethylene-based fluoropolymer-copolymer membrane and the polar form of the switchable polarity material.

16. The $CO_2$ treatment system of claim 15, wherein the $CO_2$ source comprises one or more of a hydrocarbon combustion apparatus and a biomass gasification apparatus.

17. The $CO_2$ treatment system of claim 15, wherein the source of the non-polar form of a switchable polarity material comprises a storage vessel containing one or more of a tertiary amine compound, an amidine compound, and a guanidine compound.

18. The $CO_2$ treatment system of claim 15, wherein the $CO_2$ capture apparatus comprises a gas diffusion membrane apparatus.

19. The $CO_2$ treatment system of claim 15, wherein:
the positive electrode comprises one or more of Pt and Ti; and
the negative electrode comprises an Ag-coated carbon material.

20. The $CO_2$ treatment system of claim 15, further comprising a separation apparatus downstream of the electrochemical apparatus and upstream of the $CO_2$ capture apparatus.

21. The $CO_2$ treatment system of claim 20, wherein the separation apparatus is configured to separate a gaseous phase of a multi-phase stream received thereby from at least one liquid phase of the multi-phase stream.

* * * * *

UNITED STATES PATENT AND TRADEMARK OFFICE
CERTIFICATE OF CORRECTION

PATENT NO. : 10,975,477 B2
APPLICATION NO. : 16/651738
DATED : April 13, 2021
INVENTOR(S) : Tedd E. Lister et al.

Page 1 of 1

It is certified that error appears in the above-identified patent and that said Letters Patent is hereby corrected as shown below:

On the Title Page
In ITEM (57), the Abstract,
    Fourth line,     change "proton conducting" to --proton-conducting--
    Sixth line,     change "non polar" to --non-polar--

In the Specification
Column 15,   Line 41,     change "Electrons (e)" to --Electrons (e-)--
Column 16,   Line 41,     change "micrometers (μμm)" to --micrometers (μm)--
Column 18,   Line 50,     change "electrons (e) to" to --electrons (e-) to--
Column 18,   Line 57,     change "generated e" are" to --generated e- are--

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*